(12) United States Patent  
Aoki

(10) Patent No.: US 8,521,030 B2  
(45) Date of Patent: Aug. 27, 2013

(54) TRANSCEIVER APPARATUS, COMMUNICATION CONTROL METHOD, AND CONCENTRATOR

(75) Inventor: Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 651 days.

(21) Appl. No.: 12/748,720

(22) Filed: Mar. 29, 2010

(65) Prior Publication Data

US 2010/0254704 A1    Oct. 7, 2010

(30) Foreign Application Priority Data

Apr. 7, 2009  (JP) ................................ 2009-092932  
Feb. 4, 2010  (JP) ................................ 2010-023494

(51) Int. Cl.  
*H04B 10/00* (2013.01)

(52) U.S. Cl.  
USPC ............... 398/135; 398/45; 398/69; 398/138; 455/73; 455/103; 455/127.1

(58) Field of Classification Search  
USPC ................... 398/38, 171, 135–139, 128, 130, 398/14, 22, 23, 33, 34, 58–73, 25, 43, 45, 398/51, 54; 455/39, 500, 522, 59, 61, 73, 455/572, 91, 102, 103, 127.1; 375/219, 220  
See application file for complete search history.

(56) References Cited

U.S. PATENT DOCUMENTS

| 5,617,236 A * | 4/1997 | Wang et al. .................. 398/117 |
| 2002/0046355 A1 | 4/2002 | Takeuchi |
| 2009/0162065 A1* | 6/2009 | Mizutani et al. ................ 398/66 |

FOREIGN PATENT DOCUMENTS

| JP | 61-264893 | 11/1986 |
| JP | 2002-118563 | 4/2002 |

OTHER PUBLICATIONS

100GE and 40GE PCS (MLD) Proposal, IEEE 802.3ba, May 2008.

* cited by examiner

*Primary Examiner* — M. R. Sedighian  
(74) *Attorney, Agent, or Firm* — Staas & Halsey LLP

(57) ABSTRACT

In order to reduce the power consumption of a transceiver apparatus, In a transceiver apparatus that comprises a plurality of transmitting sections that divide input data and sends the divided data using a plurality of parallel transmission channels, at least one parallel transmission channel is determined from the plurality of parallel transmission channels in accordance with an amount of data, and a power source is supplied to the transmitting section from the plurality of transmitting sections which sends the divided data using the determined parallel transmission channel, while not supplying a power source to transmitting sections from the plurality of transmitting sections which do not send the divided data.

12 Claims, 30 Drawing Sheets

FIG. 2

| Input Data | | Sync | | Block Payload | | | | | | | |
|---|---|---|---|---|---|---|---|---|---|---|---|
| Bit Position: | | 0 1 | 2 | | | | | | | | 65 |
| Data Block Format: | | | | | | | | | | | |
| $D_0 D_1 D_2 D_3/D_4 D_5 D_6 D_7$ | | 01 | | $D_0$ | $D_1$ | $D_2$ | $D_3$ | $D_4$ | $D_5$ | $D_6$ | $D_7$ |
| Control Block Formats: | | | | Block Type Field | | | | | | | |
| $C_0 C_1 C_2 C_3/C_4 C_5 C_6 C_7$ | | 10 | | 0x1e | $C_0$ | $C_1$ | $C_2$ | $C_3$ | $C_4$ | $C_5$ | $C_6$ | $C_7$ |
| $C_0 C_1 C_2 C_3/O_4 D_5 D_6 D_7$ | | 10 | | 0x2d | $C_0$ | $C_1$ | $C_2$ | $C_3$ | $O_4$ | $D_5$ | $D_6$ | $D_7$ |
| $C_0 C_1 C_2 C_3/S_4 D_5 D_6 D_7$ | | 10 | | 0x33 | $C_0$ | $C_1$ | $C_2$ | $C_3$ | $S_4$ | $D_5$ | $D_6$ | $D_7$ |
| $O_0 D_1 D_2 D_3/S_4 D_5 D_6 D_7$ | | 10 | | 0x66 | $D_1$ | $D_2$ | $D_3$ | $O_0$ | $S_4$ | $D_5$ | $D_6$ | $D_7$ |
| $O_0 D_1 D_2 D_3/O_4 D_5 D_6 D_7$ | | 10 | | 0x55 | $D_1$ | $D_2$ | $D_3$ | $O_0$ | $O_4$ | $D_5$ | $D_6$ | $D_7$ |
| $S_0 D_1 D_2 D_3/D_4 D_5 D_6 D_7$ | | 10 | | 0x78 | $D_1$ | $D_2$ | $D_3$ | | $D_4$ | $D_5$ | $D_6$ | $D_7$ |
| $O_0 D_1 D_2 D_3/C_4 C_5 C_6 C_7$ | | 10 | | 0x4b | $D_1$ | $D_2$ | $D_3$ | $O_0$ | $C_4$ | $C_5$ | $C_6$ | $C_7$ |
| $T_0 C_1 C_2 C_3/C_4 C_5 C_6 C_7$ | | 10 | | 0x87 | | $C_1$ | $C_2$ | $C_3$ | $C_4$ | $C_5$ | $C_6$ | $C_7$ |
| $D_0 T_1 C_2 C_3/C_4 C_5 C_6 C_7$ | | 10 | | 0x99 | $D_0$ | | $C_2$ | $C_3$ | $C_4$ | $C_5$ | $C_6$ | $C_7$ |
| $D_0 D_1 T_2 C_3/C_4 C_5 C_6 C_7$ | | 10 | | 0xaa | $D_0$ | $D_1$ | | $C_3$ | $C_4$ | $C_5$ | $C_6$ | $C_7$ |
| $D_0 D_1 D_2 T_3/C_4 C_5 C_6 C_7$ | | 10 | | 0xb4 | $D_0$ | $D_1$ | $D_2$ | | $C_4$ | $C_5$ | $C_6$ | $C_7$ |
| $D_0 D_1 D_2 D_3/T_4 C_5 C_6 C_7$ | | 10 | | 0xcc | $D_0$ | $D_1$ | $D_2$ | $D_3$ | | $C_5$ | $C_6$ | $C_7$ |
| $D_0 D_1 D_2 D_3/D_4 T_5 C_6 C_7$ | | 10 | | 0xd2 | $D_0$ | $D_1$ | $D_2$ | $D_3$ | $D_4$ | | $C_6$ | $C_7$ |
| $D_0 D_1 D_2 D_3/D_4 D_5 T_6 C_7$ | | 10 | | 0xe1 | $D_0$ | $D_1$ | $D_2$ | $D_3$ | $D_4$ | $D_5$ | | $C_7$ |
| $D_0 D_1 D_2 D_3/D_4 D_5 D_6 T_7$ | | 10 | | 0xff | $D_0$ | $D_1$ | $D_2$ | $D_3$ | $D_4$ | $D_5$ | $D_6$ | |

VERTICAL LINES REPRESENT VACANCIES

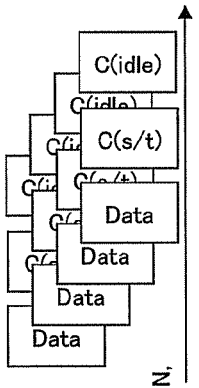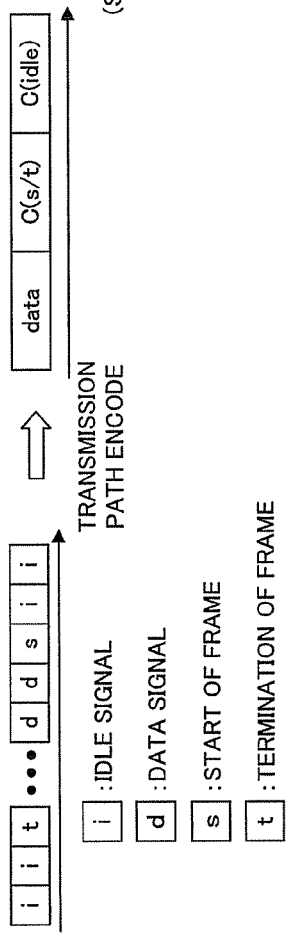

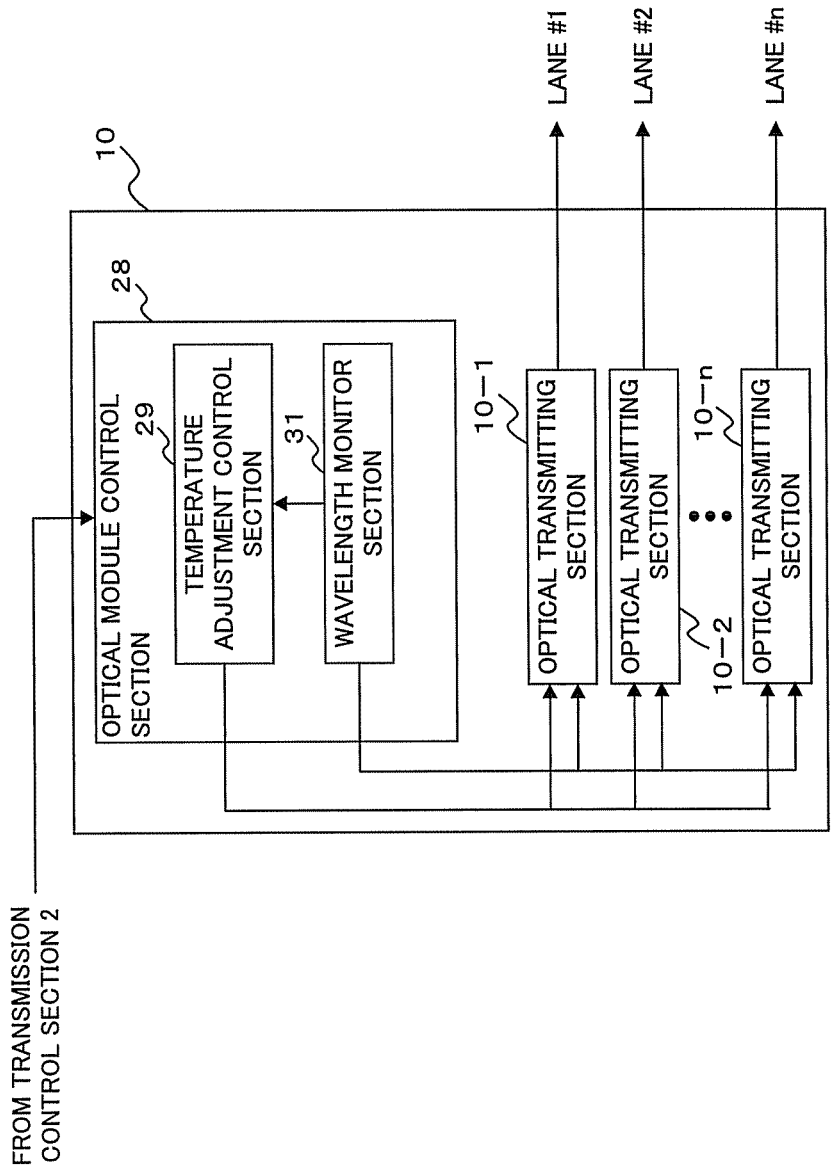

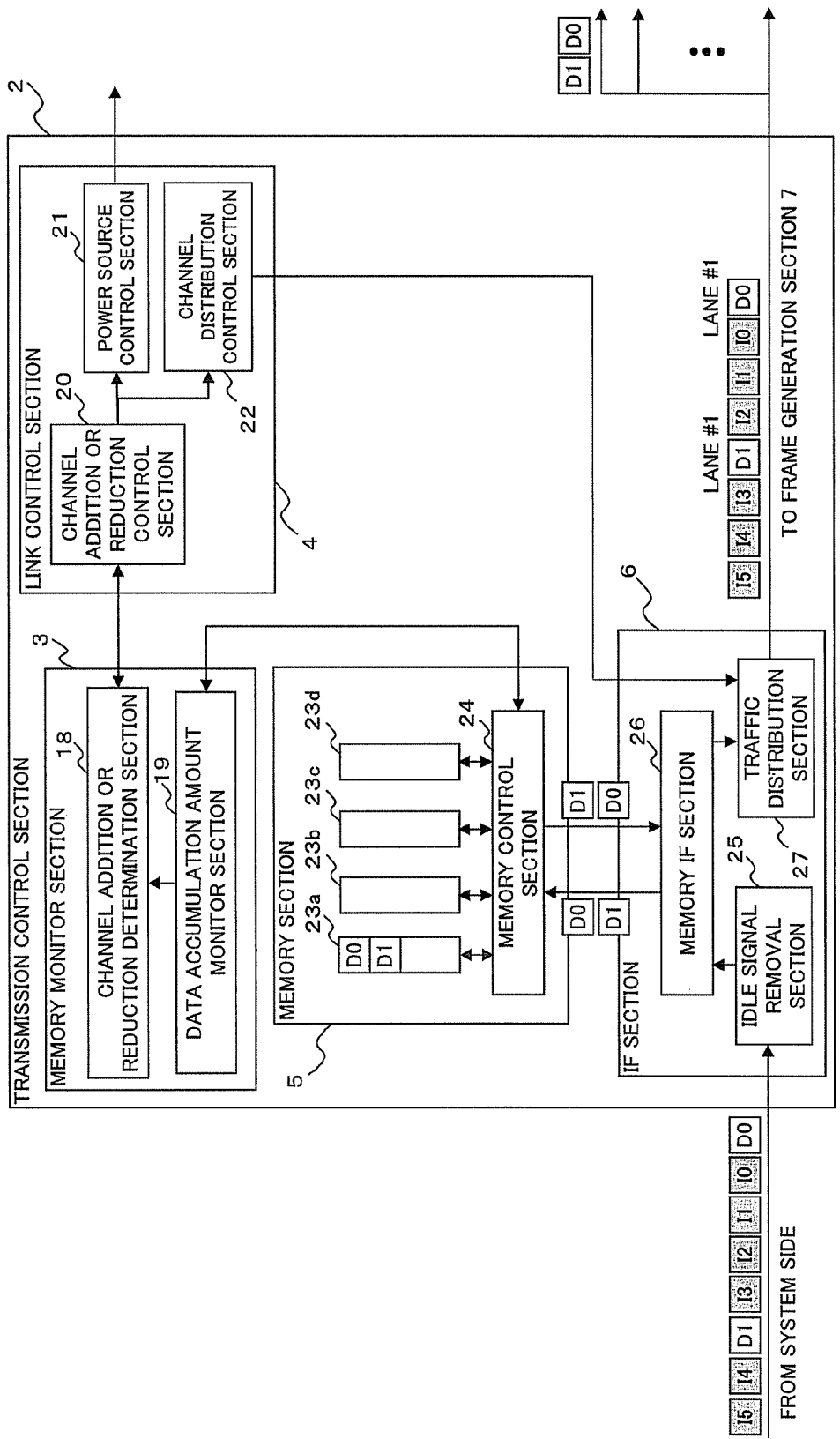

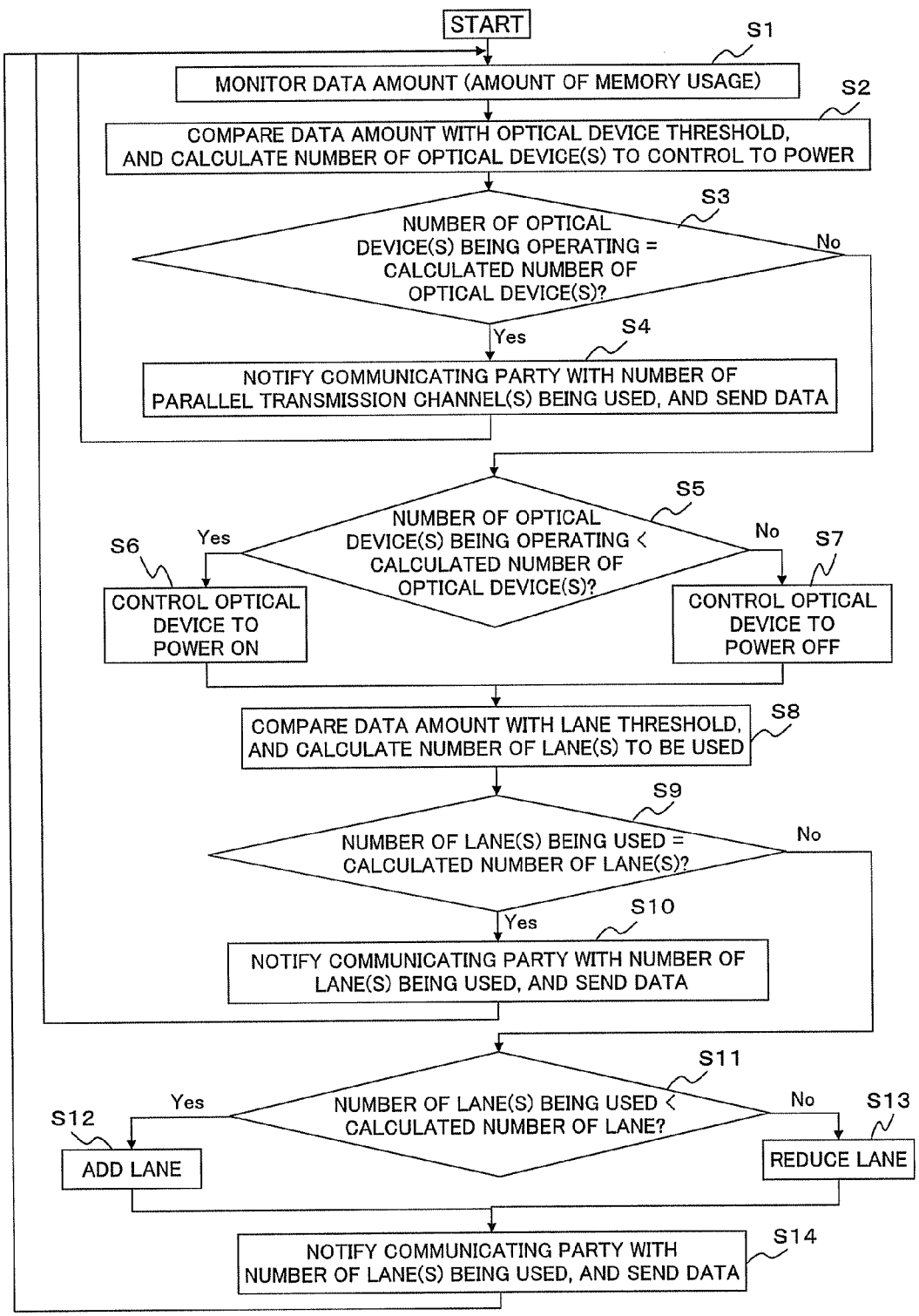

FIG. 21

| PORT NUMBER | LINK NUMBER | LANE NUMBER |
|---|---|---|
| #1 | #1 | 1 |
| #2 | #2 | 1 |
| ... | ... | ... |
| #20 | #20 | 1 |
| #21 | #2 | 2 |
| #22 | #2 | 3 |
| #23 | #2 | 4 |
| ... | ... | ... |
| #40 | #20 | 2 |

FIG. 22

| LINK NUMBER | NUMBER OF LANES USED |
|---|---|
| #1 | 1 |
| #2 | 4 |
| ... | ... |
| #20 | 2 |

FIG. 26
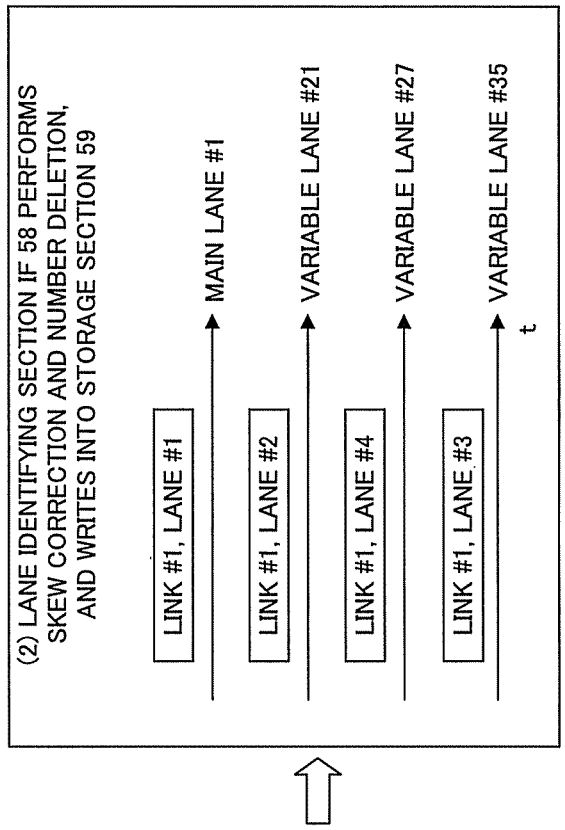
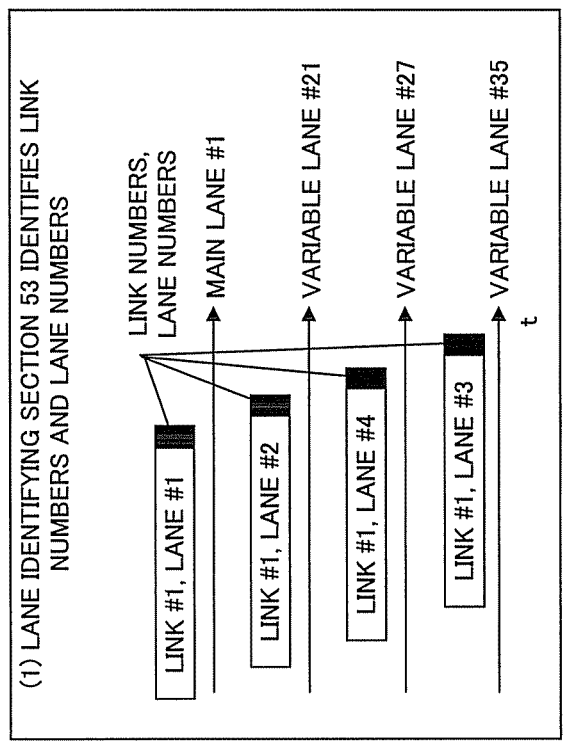
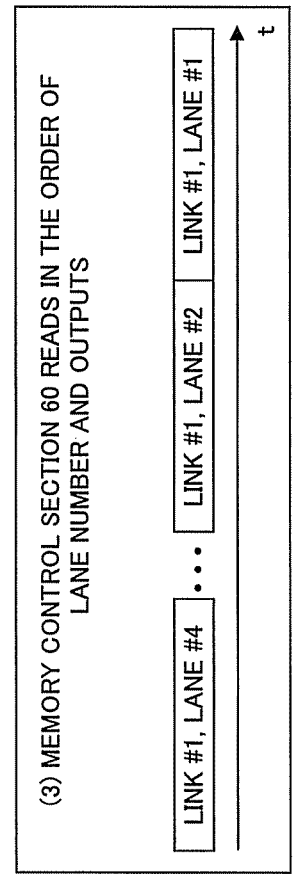

TRANSCEIVER APPARATUS, COMMUNICATION CONTROL METHOD, AND CONCENTRATOR

CROSS-REFERENCE TO RELATED APPLICATION

This application is based on and hereby claims priority to two Japanese Applications No. 2009-092932 filed on Apr. 7, 2009 and No. 2010-023494 filed on Feb. 4, 2010 in Japan, the contents of which are hereby incorporated by reference.

FIELD

The present invention relates to a transceiver apparatus, a communication control method, and a concentrator. Such a transceiver apparatus includes a transceiver apparatus that transmits data through a plurality of parallel transmission channels, for example.

BACKGROUND

Recently, transceiver systems employing wavelength divisional multiplexing (WDM) have been studied in order to achieve a large capacity data transmission. Furthermore, communication standards have been established for such transceiver systems, which specify a link speed per channel (ch) between transceiver apparatuses as about 100 Gbps.

As one example of such communication standards, the multi-lane distribution (MLD) scheme which achieves an overall link speed of 100 Gbps by binding a plurality of parallel transmission channels that transmit serial signal strings, for example, has been studied.

In the above MLD scheme, at a sending-side transceiver apparatus, a serial signal string that is to be sent is divided into a plurality of virtual lanes, the plurality of virtual lanes are bound to the respective parallel transmission channels, and pieces of data are transmitted through a plurality of transmitting sections. On the other hand, on the receiving side, the pieces of data that are transmitted through the respective parallel transmission channels is received by a plurality of receiving sections, and the received plurality of pieces of data are converted back to the serial signal string.

It is noted that, one technique to reduce the power consumption in a transceiver apparatus has been well known, which causes an optical transceiver to transition into a standby status that is a low power consumption mode, in synchronization with a transition of the physical layer (PHY) into the low power consumption mode.

Patent Document 1: Japanese Laid-Open Patent Application No. 2002-118563

However, in some cases, the above-described methods may not be able to reduce the power consumption of a transceiver apparatus.

SUMMARY (1) As a first proposal, a transceiver apparatus may be used for dividing input data and sending the divided data using a plurality of parallel transmission channels, the transceiver apparatus including: a plurality of transmitting sections that are capable of sending the divided data using the plurality of parallel transmission channels; a channel determination section that determines at least one parallel transmission channel to be used from the plurality of parallel transmission channels in accordance with an amount of data; and a power source control section that supplies a power source to a transmitting section which sends the divided data using the parallel transmission channel determined by the channel determination section from the plurality of transmitting sections while not supplying a power source to a transmitting section which does not sends the divided data from the plurality of transmitting sections.

(2) In addition, as a second proposal, a transceiver apparatus may be used for receiving divided data using a plurality of parallel transmission channels, the transceiver apparatus including: a plurality of receiving sections that are capable of receiving, using the plurality of parallel transmission channels, the divided data, and control information related to at least one parallel transmission channel from the plurality of parallel transmission channels which are determined to be used by the transceiver apparatus according to the above (1), in accordance with an amount of data; and a power source control section that supplies a power source, based on the control information received by the receiving sections, to the receiving section that corresponds to the least one parallel transmission channel which is to be used from the plurality of transmitting sections while not supplying a power source to a transmitting section that does not correspond to the at least one parallel transmission channel which is to be used from the plurality of transmitting sections.

(3) Furthermore, as a third proposal, a communication control method may be used for a transceiver apparatus that includes a plurality of transmitting sections that divide input data and send the divided data using a plurality of parallel transmission channels, the method including: determining at least one parallel transmission channel from the plurality of parallel transmission channels in accordance with an amount of data; and supplying a power source to the transmitting section from the plurality of transmitting sections which send the divided data using the determined parallel transmission channel while not supplying a power source to a transmitting section from the plurality of transmitting sections which do not send the divided data.

(4) In addition, as a fourth proposal, a communication control method may be used for a transceiver apparatus that includes a plurality of receiving section that receives divided data using a plurality of parallel transmission channels, the method including: receiving, using the plurality of parallel transmission channels, the divided data, and control information related to at least one parallel transmission channel from the plurality of parallel transmission channels which are determined to be used by the transceiver apparatus according to the above (1), in accordance with an amount of data; and supplying a power source, based on the control information received by the receiving sections, to the receiving section that corresponds to the least one parallel transmission channel which is to be used from the plurality of transmitting sections while not supplying a power source to a transmitting section that does not correspond to the at least one parallel transmission channel which is to be used from the plurality of transmitting sections.

(5) Furthermore, as a fifth proposal, a transmission method including the transceiver apparatus according to the above (1) and the transceiver apparatus according to the above (2) is used.

(6) In addition, as a sixth proposal, a concentrator may be used, including: an optical switch including: a plurality of input ports, each of the plurality of input ports being connected to one of the plurality of transceiver apparatuses according to above (1) via a plurality of parallel transmission channels; and a plurality of output ports selectively connected to the plurality of input ports, the number of plurality of output ports being smaller than the number of the plurality of input ports; a plurality of optical modules, each of the plurality of optical modules being connected to one of the output ports and processes data sent from the plurality of transceiver apparatuses; and a control section that controls connection of an input port and an output port in the optical switch based on control information on usage of the parallel transmission channels by each of the transceiver apparatuses, the information being extracted from data by the process, wherein the control section controls connection of an input port and an output port in the optical switch such that a parallel transmission channel used by the transceiver apparatus is connected to the optical module.

(7) Furthermore, as a seventh proposal, a transmission method, which includes the transceiver apparatus according to the above (1) and the concentrator according to the above (6), may be used.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating one example of channel encoding processing;

FIGS. 3A-3C are diagrams illustrating one example of a transmission frame transmission;

FIG. 7 is a diagram illustrating one example of the configuration of an optical transmission section;

FIG. 8 is a diagram illustrating one example of the configuration of a transmission control section;

FIG. 9 is a diagram illustrating one example of the operation of the transceiver apparatus depicted in FIG. 4;

FIG. 21 is a diagram illustrating one example of the contents in the table depicted in FIG. 17;

FIG. 22 is a diagram illustrating one example of the contents in the table depicted in FIG. 17;

FIG. 26 is a diagram illustrating one example of the operation of the transceiver system depicted in FIG. 17;

DESCRIPTION OF EMBODIMENTS

Hereunder is a description of embodiments with reference to the drawings. Note that the embodiments described below are described by way of example only, and various modifications and applications of techniques that are not provided explicitly in the following embodiments are not intended to be excluded. That is, the present embodiment can be practiced in various ways (by combining examples, for example) without departing from the spirit thereof.

(1) One Embodiment

Figure 1:
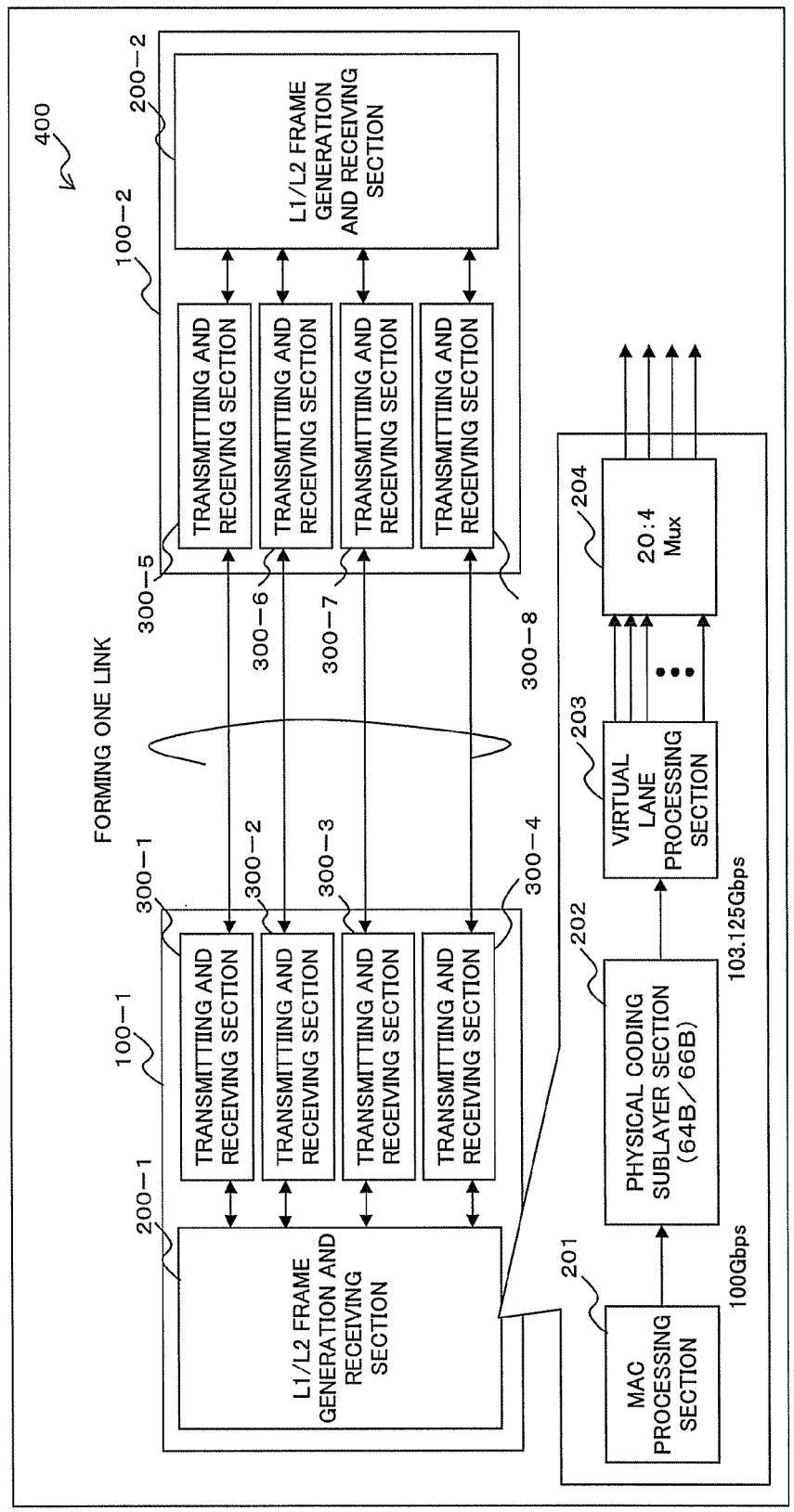
FIG. 1 is a diagram illustrating one example of the configuration of a transceiver apparatus.

FIG. 1 is a diagram illustrating one example of the configuration of a transceiver system according to the MLD scheme.

The transceiver system 400 depicted in FIG. 1 may include a transceiver apparatus 100-1, and the other transceiver apparatus 100-2 that is connected to the transceiver apparatus 100-1 via a transmission path, for example.

The transceiver system 400 depicted in FIG. 1 may use four 25-Gbps parallel transmission channels (hereinafter, simply referred to as "lanes") between the transceiver apparatuses 100-1 and 100-2 that are located 40 km apart, thereby achieving an overall link speed of 100 Gbps, for example. It is noted that the number of parallel transmission channels between the transceiver apparatuses 100-1 and 100-2 are not limited to four, and ten 10-Gbps parallel transmission channels may be used to achieve an overall link speed of 100 Gbps, for example. Furthermore, the link speed between the transceiver apparatuses 100-1 and 100-2 may be 100 Gbps or greater.

In this example, the transceiver apparatus 100-1 may include an L1/L2 frame generating and receiving section 200-1 and transmitting and receiving sections 300-1 to 300-4, for example. In addition, the transceiver apparatus 100-2 may include an L1/L2 frame generating and receiving section 200-2 and transmitting and receiving sections 300-5 to 300-8, for example.

The L1/L2 frame generating and receiving section 200-1 (200-2) generate a frame that is to be sent to the transceiver apparatus 100-2 (100-1) while receiving a frame sent from the other transceiver apparatus 100-2 (100-1).

Furthermore, the L1/L2 frame generating and receiving section 200-1 (200-2) generate a serial signal string, channel-encodes the generated serial signal string in a predetermined unit, and distributes the channel-encoded serial signal string (transmission frame) to the plurality of transmitting and receiving sections 300-1 to 300-4 (300-5 to 300-8). Noted that, as the distribution method, the round-robin scheme may be used, for example. Furthermore, the L1/L2 frame generating and receiving section 200-1 (200-2) converts the frame received by the plurality of transmitting and receiving sections 300-1 to 300-4 (300-5 to 300-8) into the serial signal string.

For this purpose, the L1/L2 frame generating and receiving section 200-1 (200-2) may include an MAC (Media Access Control) processing section 201, a physical coding sublayer (PCS) section 202, a virtual lane processing section 203, and a multiplexer (Mux) 204, for example.

The MAC processing section 201 generates a serial signal string containing data to be sent to the other transceiver apparatus 100-2 (100-1), and sends out the serial signal string to the physical coding sublayer section 202. Upon the generation, the MAC processing section 201 fills idle signals or control bytes into section where corresponding data is not present. Filling idle signals or control bytes into sections where corresponding data is not present into a serial signal string allows the transceiver apparatuses 100-1 and 100-2 to use a bandwidth of 100 Gbps, irrespective of the actual bandwidth of data, for example. Thereby, in a serial link transmission scheme, transmission and reception of continuous signals are made possible between the transceiver apparatuses 100-1 and 100-2, and an easy clock data recovery (CDR) can be facilitated. In addition, in a parallel link transmission scheme, a comparable data transmission can be achieved before and after deletion of idle signals, as long as the minimum number of links are maintained between the transceiver apparatuses 100-1 and 100-2. It is noted that the transmission bandwidth between the MAC processing section 201 and the physical coding sublayer section 202 in this example is 100 Gbps.

The physical coding sublayer section 202 executes encoding processing on the serial signal string from the MAC processing section 201. For example, the physical coding sublayer section 202 recognizes a pattern of the serial signal string from the MAC processing section 201 in a predetermined unit, and executes channel encoding processing in accordance with the pattern.

Herein, one example of the above channel encoding processing is illustrated in FIG. 2.

As depicted in FIG. 2, for example, when a part of a serial signal string are eight data bytes ($D_0$ to $D_7$) of each of eight bytes (see the data block format), the physical coding sublayer section 202 adds "01" before the 64-byte partial serial signal string as sync bytes (Sync).

On the other hand, when a signal other than data bytes (for example, an idle signal or a control byte) ($C_0$ to $C_7$, $O_0$, $O_4$, $S_0$, $S_4$, $T_0$ to $T_7$) is included in a part of the serial signal string (see the control block format), the physical coding sublayer section 202 adds "10" before the 64-byte partial serial signal string as sync bytes. In this case, since the size of each of an idle signal and an control byte is less than eight bytes (for example, seven bytes), the physical coding sublayer section 202 further adds a 8-byte block type field. As depicted in FIG. 2, there are 15 channel encoding patterns to in which a sync bytes of "10" is added, for example.

As described above, the physical coding sublayer section 202 executes channel encoding processing by sectioning a predetermined unit from a serial signal string, and adding a 2-byte sync bytes before a 64-byte serial signal string. The 66-byte serial signal string which undergoes the channel encoding processing by the physical coding sublayer section 202 is sent out to the virtual lane processing section 203. Since the signal length of the serial signal string is adjusted to be a multiple of 66 bytes/64 bytes by the physical coding sublayer section 202, the transmission bandwidth between the physical coding sublayer section 202 and the virtual lane processing section 203 becomes 103.125 Gbps (i.e., 100 Gbps×66 byte/64 bytes).

The virtual lane processing section 203 distributes a plurality of blocks (data blocks or control blocks) contained in the serial signal string (transmission frame), which undergoes a channel encoding by the physical coding sublayer section 202, into a plurality of virtual lanes. It is noted that, for the distribution method, the round-robin scheme may be used, as described previously.

In the example depicted in FIG. 1, the blocks are distributed by the virtual lane processing section 203 among 20 virtual lanes, each of which has a transmission bandwidth of about 5 Gbps, for example, and are sent out to the Mux 204. It is noted that since the serial signal string is made of continuous signals having idle signals or the like interposed therein, the virtual lane processing section 203 can distribute the blocks to a plurality of virtual lanes, without taking the actual bandwidth of the data into consideration. In this example, data blocks ($D_0$ to $D_7$) and control blocks ($C_0$ to $C_7$, $O_0$, $O_4$, $S_0$, $S_4$, $T_0$ to $T_7$) depicted in FIG. 2 are distributed by the virtual lane processing section 203 to virtual lanes 1, 2, 3, 4, 1, 2, 3, and 4, in this order, from the leftmost column in the table in FIG. 2, for example.

The Mux 204 multiplexes the virtual lanes distributed by the virtual lane processing section 203. The Mux 204 in this example is configured as a 20:4 multiplexer, and binds a plurality of (five, in FIG. 1) virtual lanes received from the virtual lane processing section 203, and outputs transmission frames to the transmitting and receiving sections 300-1 to 300-4 (300-5 to 300-8) corresponding to a plurality of (four, in FIG. 1) parallel transmission channels.

The transmitting and receiving sections 300-1 to 300-4 (300-5 to 300-8) modulate a transmission frame generated by the L1/L2 frame generating and receiving section 200-1 (200-2) into an optical signal, and sends it out to the receiving-side transceiver apparatus 100-2 (100-1) through the plurality of parallel transmission channels.

On the other hand, the receiving-side transceiver apparatus 100-2 (100-1) receives the transmission frame by a plurality of transmitting and receiving sections 300-5 to 300-8 (300-1 to 300-4) through the plurality of parallel transmission channels.

The received transmission frame is converted to a serial signal string by the L1/L2 frame generating and receiving section 200-2 (200-1) using the procedure that is reversed to the procedure on the sending side.

As described previously, the transceiver system exemplified in FIG. 1 achieves a large capacity transmission bandwidth (high link speed) by binding a plurality of parallel transmission channels into a single link.

However, in the transceiver apparatuses 100-1 and 100-2 described above, the power consumption may be increased since the transmitting and receiving sections 300-1 to 300-8 are operated without taking the amount of data (data byte amount) contained in a serial signal string into consideration.

Assuming that a serial signal string containing idle signals "i," data signals "d," a frame start signal "s", and a frame termination signal "t" is sent by the transceiver apparatus 100-1, as depicted in FIG. 3A, for example.

In this case, the physical coding sublayer section 202 executes a channel encoding on this serial signal string to obtain a transmission frame illustrated in FIG. 3B. This transmission frame includes an idle signal (C (idle)) and a frame start/termination signal (C (sit)), as a control byte, and a data signal (data), for example.

The transmission frame depicted in FIG. 3B is then distributed to the plurality of lanes (multi-lane distribution) by the virtual lane processing section 203 and the Mux 204, which results in a plurality of transmission frames depicted in FIG. 3C being sent out to the receiving-side transceiver apparatus 100-2 through the respective parallel transmission channels. It is noted that various types of processing, such as skew correction, serialization, may be executed upon the multi-lane distribution.

Idle signals are also distributed to the respective parallel transmission channels, as depicted in FIG. 3C. As the ratio of idle signals in the serial signal string (transmission frame) increases (as the data traffic reduces), the transmitting and receiving sections 300-1 to 300-8 become more redundant with respect to the effective bandwidth. As a result, the power consumptions of the transmitting and receiving sections 300-1 to 300-8 and stand-by powers of the transceiver apparatuses 100-1 and 100-2 may be increased in relative terms. Furthermore, when the bandwidth is further increased in the above transceiver system 400, the power consumption may be further increased since the additional transmitting and receiving sections 300-1 to 300-8 are provided.

(1.1) Example of Configuration of Transmission System

Figure 4:
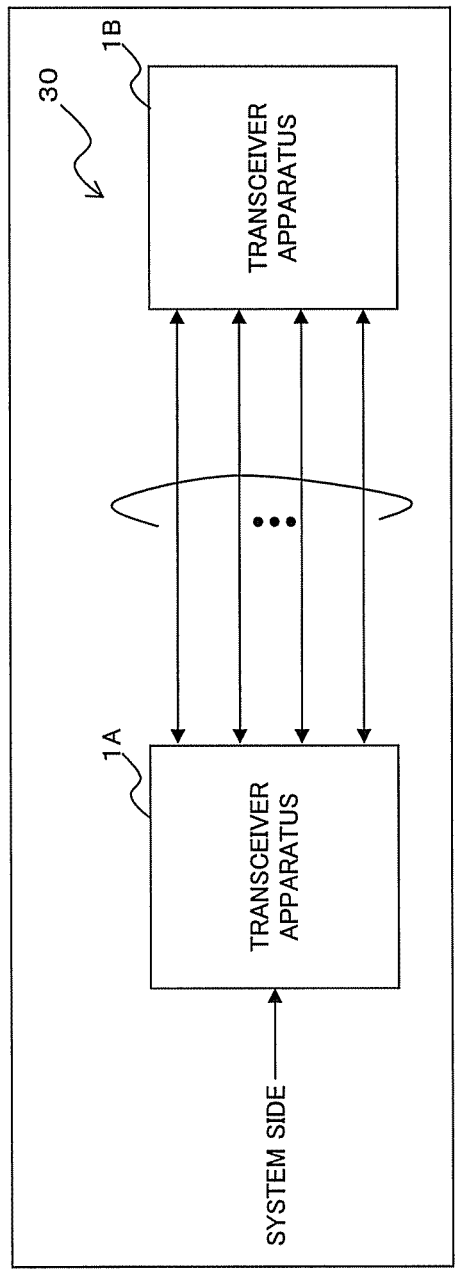
FIG. 4 is a diagram illustrating one example of the configuration of a transceiver system.

FIG. 4 is a diagram illustrating one example of the configuration of a transceiver system according to one embodiment in which the above issues are taken into consideration. The transceiver system 30 depicted in FIG. 4 may include a transceiver apparatus 1A, and a transceiver apparatus 1B that is connected to the transceiver apparatus 1A via a transmission path, for example. It is noted that the transceiver apparatus 1A and 1B are simply refereed to as a "transceiver apparatus 1" when no distinction between them is required.

The transceiver apparatus 1A divides data inputted from the system side, for example, and sends and receives the divided data (hereinafter, simply referred to as "divided data") to and from the transceiver apparatus 1B through a plurality of parallel transmission channels. In this example, it may be configured such that the data is inputted to the transceiver apparatus 1A through one input channel, and the divided data is sent through a plurality of parallel transmission channels corresponding to the input channel. Furthermore, as the multi-lane multiplexing scheme in the optical domain by the plurality of parallel transmission channels, the space division multiplexing scheme using parallel optical fibers and the wavelength division multiplexing (WDM) scheme may be used, for example.

(1.2) Example of Configuration of Transceiver Apparatus 1

Figure 5:
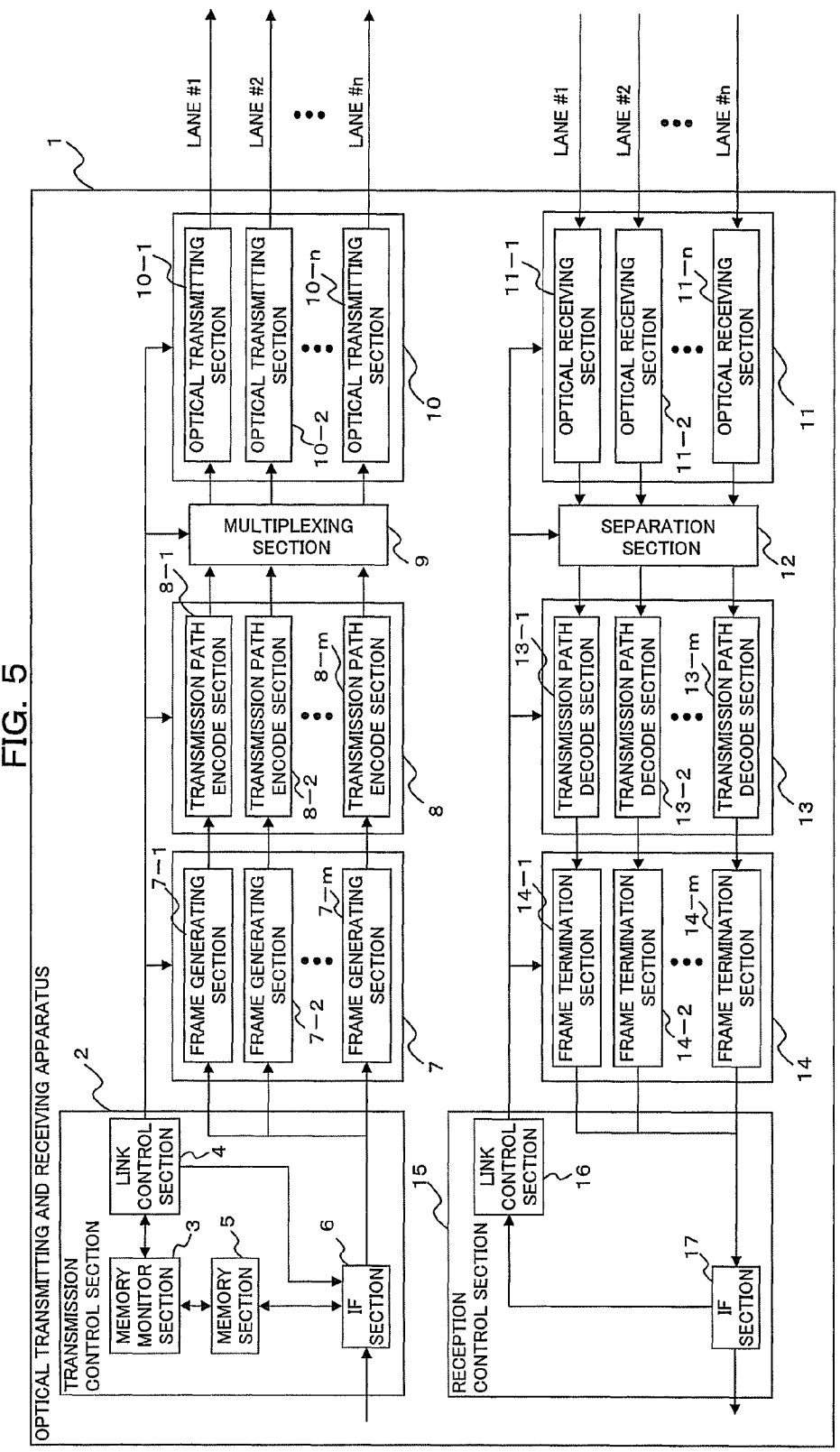
FIG. 5 is a diagram illustrating one example of the configuration of the transceiver apparatus depicted in FIG. 4.

Referring to FIG. 5, one example of the configuration of a transceiver apparatus 1 is depicted.

The transceiver apparatus 1 depicted in FIG. 5 may include a transmission control section 2, a frame generation section 7, a transmission path encode section 8, a multiplexing section 9, an optical transmitting section 10, an optical receiving section 11, a separation section 12, a transmission path decode section 13, a frame termination section 14, and a reception control section 15, for example.

Firstly, the configuration of the sending side of the transceiver apparatus 1 will be described.

The transmission control section 2 controls the arrangement of data and idle signals generated on the system side to generate a serial signal string. Furthermore, the transmission control section 2 can also place a frame start signal "s" indicating a starting position of the transmission frame, a frame termination signal "t" indicating the termination position of the transmission frame, and control information "c" relating to the parallel transmission channel that is used, into predetermined positions in the serial signal string. The serial signal string generated by the transmission control section 2 is sent out to the frame generation section 7.

Furthermore, the transmission control section 2 buffers the data for generating the serial signal string. The transmission control section 2 then determines parallel transmission channels to be used in accordance with the amount of inputted data (the amount of buffered data), and controls power source supplies to the frame generation section 7, the transmission path encode section 8, and the optical transmitting section 10, based on this determination.

For this purpose, the transmission control section 2 may include a memory monitor section 3, a link control section 4, a memory section, and an interface (IF) section 6, for example.

The IF section 6 includes a function to interface between the system side and the transmission control section 2. Furthermore, the IF section 6 receives data and idle signals generated on the system side, and sends out the received data to the memory section 5.

Furthermore, the IF section 6 reorders the data and the idle signals read from the memory section 5 based on the control from the link control section 4, which will be described later, to generate a serial signal string. Furthermore, the IF section 6 divides data contained in the generated serial signal string, and distributes the divided data to the frame generation section 7. It is noted that, as the distribution, the round-robin scheme may be used, for example.

The memory section 5 buffers the divided data received from the IF section 6. It is noted that the memory section 5 may include a plurality of memory devices, and may be adapted to buffer idle signals in addition to divided data. In this case, the memory section 5 may include a data memory for buffering divided data and an idle signal memory for buffering idle signals.

The memory monitor section 3 monitors the amount of data inputted from the system side, and determines parallel transmission channels which is to be used for data transmission, based on the monitor result. The memory monitor section 3 in this example may be adapted to monitor the amount of divided data buffered in the memory section 5 (i.e., the buffer usage rate), for example, and the memory monitor section 3 may determine the number of parallel transmission channels to be used (or addition or reduction thereof) according to the amount of the divided data.

Furthermore, control information on the parallel transmission channels, which are determined by the memory monitor section 3 to be used, may be sent out to the frame generation section 7, together with the divided data, by the IF section 6. This allows notification of the control information on the parallel transmission channels which are determined by the memory monitor section 3 to be used, to the other transceiver apparatus 1B. This allows the transceiver apparatus 1B to control power source supplies to components on the receiving side (the optical receiving section 11, the separation section 12, the transmission path encode section 13, and the frame termination section 14), based on the control information. It is noted that the control information may include information on addition or reduction of a parallel transmission channel of the plurality of parallel transmission channels, which is determined by the memory monitor section 3 to be used, or may include information on a parallel transmission channels is are determined not to be used by the memory monitor section 3 (information on addition or reduction thereof). Furthermore, the control information may be included in the header part of a transmission frame to be sent by the transceiver apparatus 1. Furthermore, the control information may be sent through at least one parallel transmission channel, or may be sent through a channel which is ensured to be used between the transceiver apparatuses 1A and 1B.

Figure 6A:
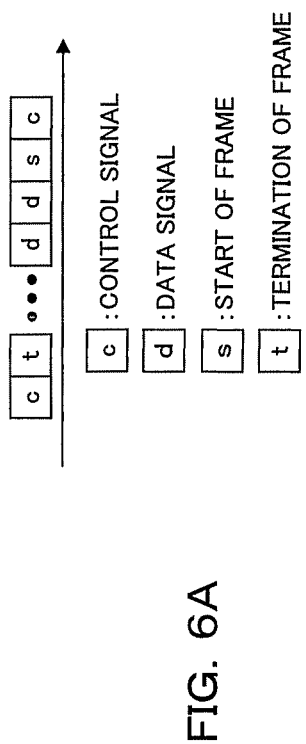
FIGS. 6A and 6B are diagrams illustrating one example of control information.

Herein, one example of placement of control information is illustrated in FIG. 6A.

As exemplified in FIG. 6A, the control information may be placed in an inter-frame gap, such as before the frame start signal "s" or after the frame termination signal "t" in a serial signal string generated by the IF section 6.

Figure 6B:
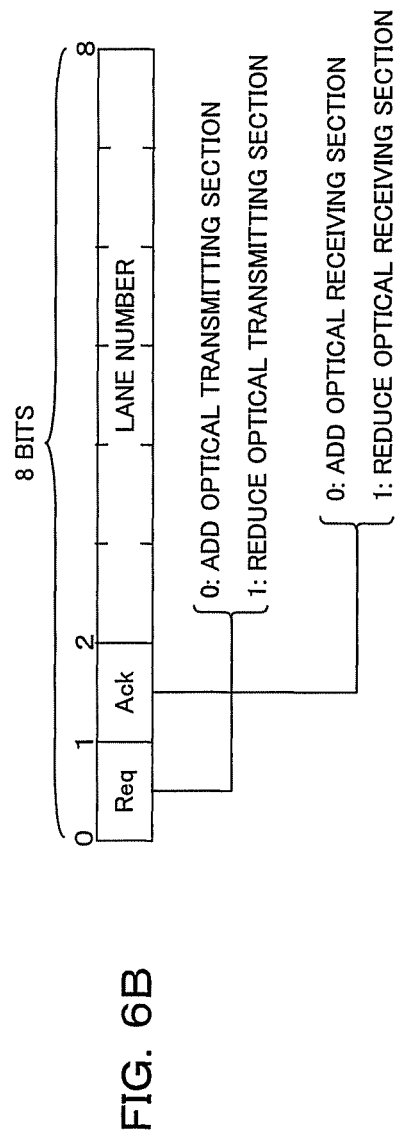

Furthermore, as exemplified in FIG. 6B, control information may be formed of eight bits, for example. In the control information exemplified in FIG. 6B, information "Req" on addition or deletion of an optical transmitting section 10-1 to 10-$n$ may be placed at the first bit, and information "Ack" on addition or deletion of an optical receiving section 11-1 to 11-$n$ is placed at the second bit. Furthermore, the identification number (lane number) of a parallel transmission channel to be added or deleted may be stored from the third to eighth bits.

The link control section 4 controls power source supplies to frame generation sections 7-1 to 7-$m$ (m is an integer of 2 or greater), transmission path encode sections 8-1 to 8-$m$, the multiplexing section 9, and optical transmitting sections 10-1 to 10-$n$ (n is an integer of 2 or greater), based on the determination by the memory monitor section 3. For example, the link control section 4 supplies power sources to the frame generation sections 7-1 to 7-$m$, the transmission path encode sections 8-1 to 8-$m$, the multiplexing section 9, and the optical transmitting sections 10-1 to 10-$n$, which send the divided data using the parallel transmission channel which are determined by the memory monitor section 3 to be used. In contrast, the link control section 4 may not supply a power source (or halt a power source supply) to the frame generation sections 7-1 to 7-$m$, the transmission path encode sections 8-1 to 8-$m$, the multiplexing section 9, and optical transmitting sections 10-1 to 10-$n$ corresponding to parallel transmission channels which do not send the divided data.

Furthermore, the link control section 4 may control placement (rearrangement) of the divided data by the IF section 6 based on the determination by the memory monitor section 3. For example, the link control section 4 controls placement positions of data in a serial signal string such that divided data is distributed to parallel transmission channels which are determined by the memory monitor section 3 to be used. This enables the divided data to be distributed to the parallel transmission channels, which are determined by the memory monitor section 3 to be used, even when the serial signal string is distributed by the IF section 6 according to the round-robin scheme, for example. On the other hand, idle signals may be distributed to parallel transmission channels which are determined by the memory monitor section 3 not to be used. Furthermore, parallel transmission channels, which are determined by the memory monitor section 3 to be used, may carry control information related to the parallel transmission channels, as well as data.

The frame generation section 7 includes frame generation sections 7-1 to 7-$m$. The frame generation sections 7-1 to 7-$m$ execute predetermined frame generation processing on the respective serial signal strings distributed by the IF section 6 to generate a transmission frames. The transmission frames generated by the frame generation sections 7-1 to 7-$m$ are sent out to the transmission path encode section 8. Furthermore, powering on and off of the frame generation sections 7-1 to 7-$m$ are controlled by the power source supply from the link control section 4.

The transmission path encode section 8 includes transmission path encode sections 8-1 to 8-$m$. The transmission path encode sections 8-1 to 8-$m$ execute predetermined channel encoding processing on the respective transmission frame inputted from the frame generation sections 7-1 to 7-$m$. The transmission frames that undergo the channel encoding processing by the transmission path encode sections 8-1 to 8-$m$ are sent out to the multiplexing section 9. Furthermore, powering on and off of the transmission path encode sections 8-1 to 8-$m$ are controlled by the power source supply from the link control section 4.

The multiplexing section 9 multiplexes the plurality of transmission frames inputted from the transmission path encode sections 8-1 to 8-$m$ into a plurality of groups (n groups, in FIG. 5), and sends out the multiplexed signals to the optical transmitting sections 10-1 to 10-$n$.

The optical transmitting section 10 includes optical transmitting sections 10-1 to 10-$n$. The optical transmitting sections 10-1 to 10-$n$ execute predetermined optical transmission processing on the transmission frames from the multiplexing section 9, and send out the frames to the respective parallel transmission channel (Lane #1 to Lane #n). In the example depicted in FIG. 5, a plurality of optical transmission paths form a single link. Furthermore, as will be described later, the optical transmitting section 10 may include an optical module control section 28 that controls the optical transmitting sections 10-1 to 10-$n$.

That is, the frame generation section 7, the transmission path encode section 8, the multiplexing section 9, and the optical transmitting section 10 function as one example of a plurality of transmitting sections that may send divided data using a plurality of parallel transmission channels.

Next, the configuration of the receiving side of the transceiver apparatus 1 will be described.

The optical receiving section 11 includes optical receiving sections 11-1 to 11-$n$. The optical receiving sections 11-1 to 11-$n$ receive divided data from the other transceiver apparatus 1B through the plurality of parallel transmission channels (Lane #1 to Lane #n). The divided data received by the optical receiving sections 11-1 to 11-$n$ is sent out to the separation section 12. Furthermore, powering on and off of the optical receiving sections 11-1 to 11-$n$ are controlled by the power source supply from the link control section 16.

The separation section 12 separates the multiplexed signals (e.g., divided data) inputted from the optical receiving sections 11-1 to 11-$n$ into a plurality of (n, in FIG. 5) transmission frames. The respective transmission frames separated by the separation section 12 are sent out to transmission path decode sections 13-1 to 13-$m$. Furthermore, powering on and off of the separation section 12 are controlled by the power source supply from the link control section 16.

The transmission path decode section 13 includes transmission path decode sections 13-1 to 13-$m$. The transmission path decode sections 13-1 to 13-$m$ execute predetermined transmission path decoding processing on the respective m transmission frames from the separation section 12. The transmission frames that undergo the transmission path decoding processing by the transmission path decode sections 13-1 to 13-$m$ are sent out to frame termination sections 14-1 to 14-$m$. Furthermore, powering on and off of the transmission path decode sections 13-1 to 13-$m$ are controlled by the power source supply from the link control section 16.

The frame termination section 14 includes frame termination sections 14-1 to 14-$m$. The frame termination sections 14-1 to 14-$m$ execute termination processing on the respective transmission frames from the transmission path decode sections 13-1 to 13-$m$. The transmission frames that undergo the termination processing by the frame termination sections 14-1 to 14-*m* are sent out to the reception control section 15. Furthermore, powering on and off of the frame termination sections 14-1 to 14-*m* are controlled by the power source supply from the link control section 16.

The reception control section 15 converts the transmission frames from the frame termination sections 14-1 to 14-*m* to a serial signal string. Furthermore, the reception control section 15 controls power source supplies to the frame termination section 14, the transmission path encode section 13, the separation section 12, and the optical receiving section 11, based on the control information contained in the received transmission frames.

For this purpose, the reception control section 15 may include a link control section 16 and an IF section 17, for example.

The IF section 17 extracts the above-described control information contained in the divided data inputted from the frame termination section 14, and sends out the information to the link control section 16. Furthermore, the IF section 17 adds (inserts) an idle signal to the data inputted from the frame termination section 14 to generate the serial signal string, and sends it out to the system side.

The link control section 16 determines parallel transmission channels to be used based on the control information extracted by the IF section 17, and controls power source supplies to frame termination sections 14-1 to 14-*m*, transmission path encode section 13-1 to 13-*m*, the separation section 12, and optical receiving sections 11-1 to 11-*n*, which correspond to those parallel transmission channels. For example, the link control section 16 may supply power sources to frame termination sections 14-1 to 14-*m*, transmission path encode section 13-1 to 13-*m*, the separation section 12, and optical receiving sections 11-1 to 11-*n*, which correspond to the parallel transmission channels that are determined to be used based on the control information. On the other hand, the link control section 16 may not supply a power source (or halt a power source supply) to frame termination sections 14-1 to 14-*m*, transmission path encode section 13-1 to 13-*m*, the separation section 12, and optical receiving sections 11-1 to 11-*n*, which do not correspond to the parallel transmission channels that are determined to be used.

That is, the frame termination sections 14-1 to 14-*m*, the transmission path encode section 13-1 to 13-*m*, the separation section 12, and the optical receiving sections 11-1 to 11-*n* function as one example of a plurality of receiving sections that can receive, using the plurality of parallel transmission channels, divided data, and control information on at least one parallel transmission channel from the plurality of parallel transmission channels, which is determined by the other transceiver apparatus 1B to be used, in accordance with the amount of the data.

With the above configuration, since the transceiver apparatus 1 can control the power source supply in the transmitting and receiving sections in accordance with the amount of an inputted data traffic, which makes it possible to reduce the power consumption.

(1.3) Example of Configuration of Optical Transmitting Section 10

Next, one example of the configuration of the optical transmitting section 10 will be described with reference to FIG. 7.

As depicted in FIG. 7, the optical transmitting section 10 may include optical transmitting sections 10-1 to 10-*n* and an optical module control section 28, for example. It is noted that the optical transmitting section 10 may be configured as lasers for WDM, for example.

In this example, the optical module control section 28 controls the optical transmitting sections 10-1 to 10-*n*. For example, the optical module control section 28 may control the wavelengths or the device temperatures of the optical transmitting sections 10-1 to 10-*n* in accordance with the control from the transmission control section 2.

For this purpose, the optical module control section 28 may include a temperature adjustment control section 29 and a wavelength monitor section 31, for example.

The wavelength monitor section 31 monitors the wavelengths of signal light sent from the optical transmitting sections 10-1 to 10-*n*. The monitor result is provided to the temperature adjustment control section 29.

The temperature adjustment control section 29 controls the device temperatures of the optical transmitting sections 10-1 to 10-*n*. For example, the temperature adjustment control section 29 varies the device temperatures of optical transmitting sections 10-1 to 10-*n*, which correspond to the parallel transmission channels that are determined by the transmission control section 2 to be used, to an operating temperature, and further stabilizes the device temperatures. Upon varying the temperature, the temperature adjustment control section 29 may execute a temperature control based on the monitor result from the wavelength monitor section 31, for example. This may help to obtain a uniform light-emitting wavelength from light-emitting means, such as a laser, provided in the optical transmitting sections 10-1 to 10-*n*.

(1.4) Example of Configuration of Transmission Control Section 2

Next, one example of the configuration of the transmission control section 2 will be described with reference to FIG. 8. As depicted in FIG. 8, the transmission control section 2 may include an IF section 6, a memory section 5, a link control section 4, and a memory monitor section 3, for example, and the IF section 6, may include an idle signal removal section 25, a memory IF section 26, and a traffic distribution section 27, for example. Furthermore, the memory section 5 may include a memory control section 24 and memory devices 23*a* to 23*d*, for example. It is noted that the memory devices 23*a* to 23*d* are simply referred to as "memory devices 23" when no distinction among them is required, and the number of memory devices 23 are not limited to that depicted in FIG. 8. Furthermore, the memory monitor section 3 may include a data accumulation amount monitor section 19 and a channel addition or reduction determination section 18, for example. Furthermore, the link control section 4 may include a channel addition or reduction control section 20, a power source control section 21, and a channel distribution control section 22, for example.

The idle signal removal section 25 removes idle signals included in a serial signal string inputted from the system side. The serial signal string inputted from the system side contains data and idle signals that are placed randomly. In the example depicted in FIG. 8, idle signals (I0-I5) are removed from a serial signal string that is made of data (D0, D1) and the idle signals (I0-I5), and sends out the obtained data (D0, D1) to the memory IF section 26.

The memory IF section 26 sends out the data (D0, D1) received from the idle signal removal section 25 to the memory control section 24. Furthermore, the memory IF section 26 receives the data (D0, D1) from the memory control section 24 by requesting read of the data (D0, D1) to the memory control section 24, and sends out divided data (obtained by division of the data) to the traffic distribution section 27.

The traffic distribution section 27 generates idle signals (I0-I5), and reorders the generated idle signals (I0-I5) and the divided data (D0, D1), which is received from the memory IF section 26, to generate a serial signal string. For this, the traffic distribution section 27 controls the placement of divided data (D0, D1) such that the divided data (D0, D1) is distributed to frame generation section 7 which corresponds to a parallel transmission channel that is determined by the channel addition or reduction determination section 18 to be used (for example, frame generation section 7-1), for example. The serial signal string after the placement control is distributed by the traffic distribution section 27 to frame generation sections 7-1 to 7-$m$ according to the round-robin scheme, for example.

That is, the traffic distribution section 27 functions as one example of a distribution section that distributes the divided data to be sent to a frame generation section 7, a transmission path encode section 8, the multiplexing section 9, and an optical transmitting section 10 to which a power source is supplied by the power source control section 21.

The memory control section 24 controls a read from and a write to the memory devices 23. For example, the memory control section 24 writes data (D0, D1) received from the memory IF 26 to the memory device 23$a$, and reads the data (D0, D1) from the memory device 23$a$ in response to a read request from the memory IF 26 and sends out the date to the memory IF section 26. Furthermore, the memory control section 24 detects the amount of data (or the buffer usage rate for the data) in each memory device 23, for example.

The memory devices 23 store data (D0, D1). It is noted that the memory devices 23 may store idle signals (I0-I5) in addition to the data (D0, D1), for example. In such a case, the memory device 23 may be configured from a data memory for storing the data (D0, D1) and an idle signal memory for storing the idle signals (I0-I5), for example. In this case, the idle signal removal section 25 may also be omitted. Furthermore, in this case, the traffic distribution section 27 may reads the idle signal (I0-I5) from the memory devices 23, rather than generating them.

The data accumulation amount monitor section 19 monitors the accumulation amount (or the buffer usage rate) of data (D0, D1) in the memory devices 23. The monitor result is sent out to the channel addition or reduction determination section 18.

The channel addition or reduction determination section 18 determines parallel transmission channels to be used, based on the monitor result by the data accumulation amount monitor section 19. For example, the channel addition or reduction determination section 18 can compare the amount of data (buffer usage rate) in the memory devices 23 with a predetermined threshold, and determine parallel transmission channels to be used in accordance with the comparison.

That is, the channel addition or reduction determination section 18 functions as one example of a channel determination section that determines at least one parallel transmission channel from the plurality of parallel transmission channels, which is to be used, in accordance with the data amount.

The determination by the channel addition or reduction determination section 18 is sent out to the channel addition or reduction control section 20. It is noted that the channel addition or reduction determination section 18 may be adapted to determine a addition or reduction (or the number) of parallel transmission channels to be used (to be operated).

Furthermore, the channel addition or reduction determination section 18, in this example, may use an optical device threshold and a lane threshold as the above predetermined thresholds, for example. In this case, the optical device threshold includes n thresholds X1, X2, . . . , and Xn (0<X1<X2<, . . . , <Xn), and the lane threshold includes n thresholds Y1, Y2, . . . , and Yn (0<Y1<Y2<, . . . , <Yn).

Firstly, when the data usage amount reaches Xi (i=1-n) or higher, the channel addition or reduction determination section 18 supplies power sources to i optical transmitting sections 10-1 to 10-$i$ from n optical transmitting sections 10-1 to 10-$n$. It is noted that optical transmitting sections, to which a power source is supplied, are not limited to the optical transmitting section 10-1 to 10-$i$, and other combinations are possible, as long as the total count of optical transmitting sections is i.

Furthermore, the channel addition or reduction determination section 18 supplies power sources to j frame generation sections 7-1 to 7-$j$ and $j$ transmission path encode sections 8-1 to 8-$j$ (j=1-m), which correspond to the optical transmitting sections 10-1 to 10-$i$ to which the power sources are supplied. It is noted that frame generation sections and transmission path encode section, to which power sources are supplied, are not limited to the frame generation sections 7-1 to 7-$j$ and the transmission path encode sections 8-1 to 8-$j$, and other combinations are possible, as long as they correspond to the optical transmitting sections 10-1 to 10-$i$ to which the power sources are supplied.

Next, when the data usage amount reaches Yi (i=1-n) or greater, the channel addition or reduction determination section 18 determines to use i lanes from n parallel transmission channels (lanes). This allows the traffic distribution section 27 to distribute the divided data (D0, D1) to the lanes which are determined to be used.

Furthermore, by setting an optical device threshold Xi to be smaller than a lane threshold Yi, it is possible to supply power sources to respective optical devices (a frame generation section 7, a transmission path encode section 8, the multiplexing section 9, and an optical transmitting section 10) before lanes to be used are determined by the channel addition or reduction determination section 18. This ensures that the transceiver apparatus 1 can execute data transmission using parallel transmission channels.

The channel addition or reduction control section 20 controls the power source control section 21 and the channel distribution control section 22 based on the determination by the channel addition or reduction determination section 18. For example, the channel addition or reduction control section 20 can instruct the destinations of power source supplies to the power source control section 21, and can instruct placement of divided data (D0, D1) and idle signals (I0-I5) to the channel distribution control section 22.

The power source control section 21 controls supplies of power sources to a frame generation section 7, a transmission path encode section 8, the multiplexing section 9, and an optical transmitting section 10, based on the instruction from the channel addition or reduction control section 20. For example, the power source control section 21 supplies power sources to a frame generation section 7, a transmission path encode section 8, the multiplexing section 9, and an optical transmitting section 10, which correspond to the parallel transmission channels that are determined by the channel addition or reduction determination section 18 to be used. On the other hand, the power source control section 21 does not supply a power source (or halt a supply of a power source) to a frame generation section 7, a transmission path encode section 8, the multiplexing section 9, and an optical transmitting section 10, which correspond to the parallel transmission channels that are determined by the channel addition or reduction determination section 18 not to be used.

That is, the power source control section 21 functions as one example of a power source power source control section that supplies power sources to the transmitting section (a frame generation section 7, a transmission path encode section 8, the multiplexing section 9, and an optical transmitting section 10) from a frame generation section 7, a transmission path encode section 8, the multiplexing section 9, and an optical transmitting section 10, which sends divided data using the parallel transmission channels determined by the channel addition or reduction control section 20 to be used while not supplying a power source to a transmitting section from the plurality of transmitting sections which do not send the divided data.

The channel distribution control section 22 controls rearrangement of the divided data (D0, D1) and the idle signals (I0-I5) in the traffic distribution section 27, based on an instruction from the channel addition or reduction control section 20. For example, the channel distribution control section 22 controls the placement such that the divided data (D0, D1) is distributed to a frame generation section 7, a transmission path encode section 8, the multiplexing section 9, and an optical transmitting section 10, which correspond to the parallel transmission channels that are determined by the channel addition or reduction determination section 18 to be used. On the other hand, the channel distribution control section 22 controls the placement such that the idle signals, rather than the divided data (D0, D1), are distributed to a frame generation section 7, a transmission path encode section 8, the multiplexing section 9, and an optical transmitting section 10, which correspond to the parallel transmission channels that are determined by the channel addition or reduction determination section 18 not to be used.

This allows the traffic distribution section 27 to control the placement of divided data (D0, D1) and idle signals (I0-I5) such that the divided data (D0, D1) is distributed to a frame generation section 7, a transmission path encode section 8, the multiplexing section 9, and an optical transmitting section 10, which correspond to the parallel transmission channels that are determined by the channel addition or reduction determination section 18 to be used, based on a control from the channel distribution control section 22. It is noted that the traffic distribution section 27 may generate control information on the parallel transmission channels that are determined by the channel addition or reduction determination section 18 to be used, and distribute the control information to the same parallel transmission channels as the distribution destinations of the divided data.

As described above, the transmission control section 2, in this example, determines parallel transmission channels to be used in accordance with the amount of inputted data, supplies power sources to transmitting components (for example, the frame generation section 7-1, the transmission path encode section 8-1, the multiplexing section 9, and the optical transmitting section 10-1) which send the divided data, and does not supply a power source to transmitting components (for example, the frame generation sections 7-2 to 7-*m*, the transmission path encode section 8-2 to 8-*m*, and the optical transmitting section 10-2 to 10-*m*) which do not send the divided data, thereby reducing the power consumption.

In this case, since data (D0, D1) and idle signals (I0-I5) has been placed randomly in a serial signal string inputted from the system side, the divided data (D0, D1) would be distributed to transmitting components to which no power source is supplied and the transmission would fail if the serial signal string is distributed to the respective transmitting components without rearrangement.

For this reason, in this example, the data (D0, D1) and the idle signals (I0-I5) are reordered by the traffic distribution section 27 such that the divided data (D0, D1) is distributed to transmitting components to which power sources are supplied, and that the idle signals (I0-I5) are distributed to transmitting components to which no power source is supplied.

It is noted that power source supplies to all transmitting components (the frame generation section 7, the transmission path encode section 8, the multiplexing section 9, and the optical transmitting section 10) may be halted when there is no data to be sent.

(1.5) Example of Operation of Transmission Control Section 2

Next, the operation of the transmission control section 2 will be described with reference to FIG. 9.

As exemplified in FIG. 9, the data accumulation amount monitor section 19 monitors the amount of data stored in the memory devices 23 (the amount of memory usage, or buffer usage rate) (Step S1).

Next, the channel addition or reduction determination section 18 compares the monitored amount of data against the optical device threshold $Xi$, and determines the number of a frame generation section 7, a transmission path encode section 8, the multiplexing section 9, and an optical transmitting section 10 (hereinafter, they are simply referred to as "optical devices") to which power sources are to be supplied (Step S2).

Subsequently, the channel addition or reduction control section 20 determines whether or not the number of operating optical devices (to which power sources are being supplied) equals to the number of optical devices calculated at Step S2 (Step S3).

When it is determined by the channel addition or reduction control section 20 that the number of operating optical devices (to which power sources are being supplied) is equal to the number of optical devices calculated at Step S2 (Yes route in Step S3), the transmission control section 2 provides the counterpart transceiver apparatus 1B with the number of parallel transmission channels (the number of lanes) being used, and sends data by the optical devices through parallel transmission channels that are being used (Step S4).

On the other hand, when it is determined by the channel addition or reduction control section 20 that the number of operating optical devices (to which power sources are being supplied) is not equal to the number of optical devices calculated at Step S2 (No route in Step S3), the channel addition or reduction control section 20 determines whether or not the number of operating optical devices is smaller than the number of optical devices calculated at Step S2 (Step S5).

When it is determined by the channel addition or reduction control section 20 that the number of operating optical devices is smaller than the number of optical devices calculated at Step S2 (Yes route in Step S5), the power source control section 21 executes a power-on control on the optical devices (that is, supplies power sources to additional optical device(s)) until the number of operating optical devices becomes equal to the number of optical devices calculated at Step S2 (Step S6).

On the other hand, when it is determined by the channel addition or reduction control section 20 that the number of operating optical devices is greater than the number of optical devices calculated at Step S2 (No route in Step S5), the power source control section 21 executes a power-off control on the optical devices (that is, halts a supply of a power source to operating optical device(s)) until the number of operating optical devices becomes equal to the number of optical devices calculated at Step S2 (Step S7).

Next, the channel addition or reduction determination section 18 compares the amount of data buffered in the memory devices 23 against the lane threshold Yi, and determines the number of parallel transmission channels (lanes) to be used (Step S8).

Subsequently, the channel addition or reduction control section 20 determines whether or not the number of lanes being used equals to the number of lanes calculated at Step S8 (Step S9).

When it is determined by the channel addition or reduction control section 20 that the number of lanes being used is equal to the number of lanes calculated at Step S8 (Yes route in Step S9), the transmission control section 2 provides the counterpart transceiver apparatus 1B with the number of parallel transmission channels (the number of lanes) being used, and sends data by the optical devices through parallel transmission channels that are being used (Step S10).

On the other hand, when it is determined by the channel addition or reduction control section 20 that the number of optical devices being used is not equal to the number of lanes calculated at Step S8 (No route in Step S9), the channel addition or reduction control section 20 determines whether or not the number of lanes is smaller than the number of lanes being used which is calculated at Step S8 (Step S11).

When it is determined by the channel addition or reduction control section 20 that the number of lanes being used is smaller than the number of lanes calculated at Step S8 (Yes route in Step S11), the traffic distribution section 27 redistributes data to the lanes calculated at Step S8 (distributes data to additional lane(s)) (Step S12).

On the other hand, when it is determined by the channel addition or reduction control section 20 that the number of lanes being used is greater than the number of lanes calculated at Step S8 (the No route in Step S11), the traffic distribution section 27 redistributes data to the lanes calculated at Step S8 (halts distribution to lane(s) that was a distribution destination) (Step S13).

Subsequently, after the processing of the above Step S12 and S13, the transmission control section 2 provides the counterpart transceiver apparatus 1B with the number of parallel transmission channels (the number of lanes) being used, and sends data by the optical devices through parallel transmission channels that are being used (Step S14).

Figure 10:
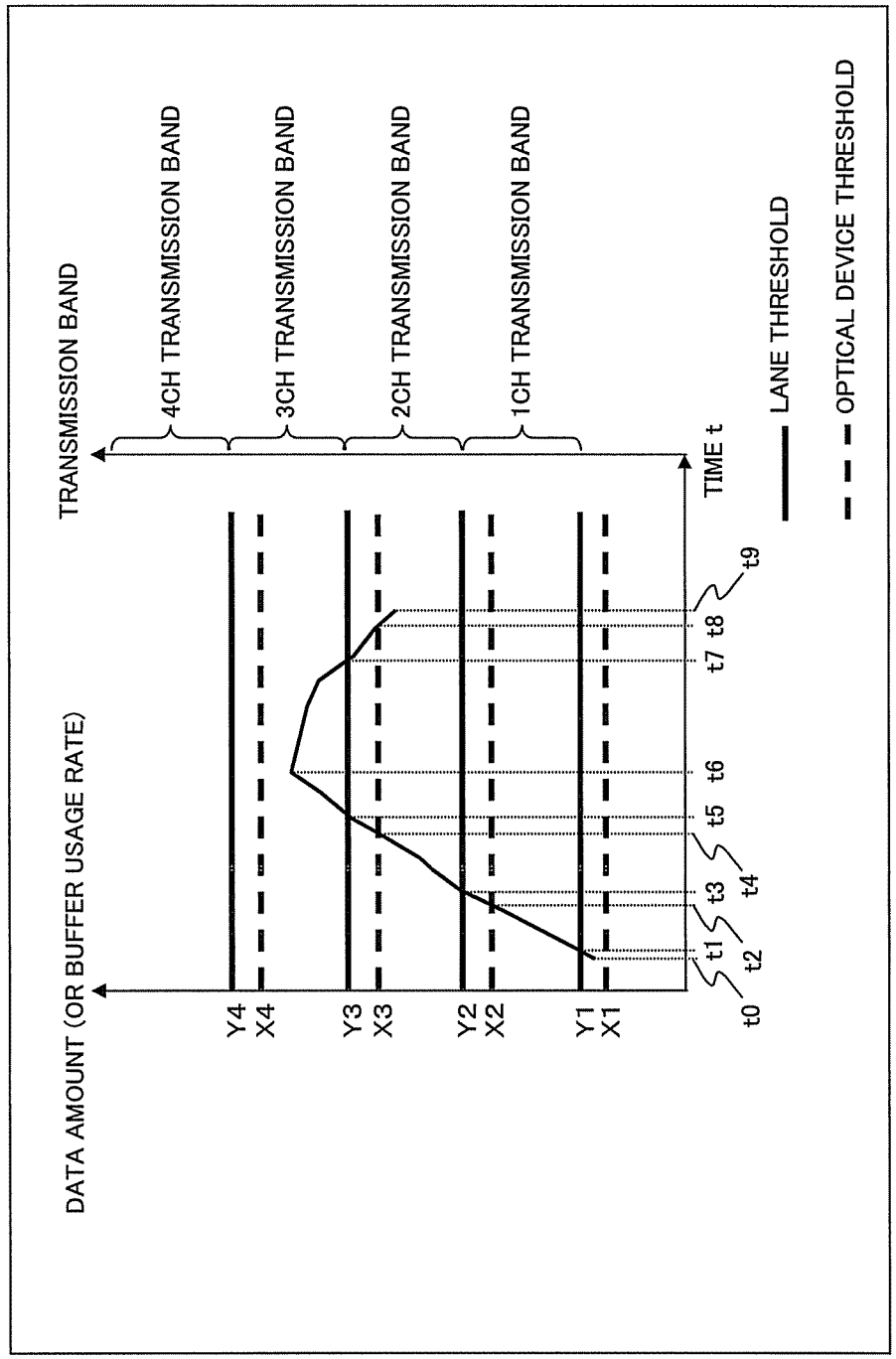
FIG. 10 is a diagram illustrating one example of the change in the data amount (or the buffer usage rate) over time.

Herein, one example of the change in the data amount (or the buffer usage rate) over time is depicted in FIG. 10.

As exemplified in FIG. 10, the transceiver apparatus 1 operates as follows when the amount of data increases at $t0 \leq t < t6$ and the amount of data decreases at $t6 \leq t \leq t9$. It is noted that t ($t \geq 0$) is a variable representing time and t0 to t9 are constants satisfying $0 \leq t0 < t1 < \ldots < t9$.

Firstly, at $t0 \leq t < t1$, the transceiver apparatus 1 supplies power sources to optical devices corresponding to the parallel transmission channel (Lane #1), for example, while not executing data transmission using Lane #1 since the amount of data is equal to or greater than the optical device threshold X1 and is smaller than the lane threshold Y1. Data that is not sent is buffered to the memory devices 23, for example. It is noted that time during when no data is sent can be prevented by such buffering by setting the value of the lane threshold Y1 to 0.

Next, at $t1 \leq t < t2$, the transceiver apparatus 1 sends data using Lane #1, for example, since the amount of data becomes equal to or greater than the lane threshold Y1.

Furthermore, at $t2 \leq t < t3$, the transceiver apparatus 3 supplies power sources to the optical devices corresponding to Lane #1 and Lane #2, for example, and sends data using Lane #1, without using Lane #2, since the amount of data is equal to or greater than the optical device threshold X2 and is smaller than the lane threshold Y2. This enables the transceiver apparatus 1 to supply power sources to the optical devices corresponding to Lane #2 in advance, for preparing for data transmission using Lane #2.

The oscillation wavelengths or the like of optical devices are usually controlled based on the device temperature, for example, and stabilization of such control requires a time of the order of seconds. Thus, by setting a smaller value to the optical device threshold Xi than that of the lane threshold Yi, it is possible to keep optical devices in an operable state when the amount of data is equal to or greater than the lane threshold Yi.

As described above, when the amount of data is equal to or greater than the lane threshold Y1 and is less than the lane threshold Y2, the transceiver apparatus 1 executes data transmission using a single parallel transmission channel (1-CH transmission bandwidth).

Next, at $t3 \leq t < t4$, the transceiver apparatus 1 sends data using Lane #1 and Lane #2, for example, since the amount of data becomes equal to or greater than the lane threshold Y2.

Furthermore, at $t4 \leq t < t5$, the transceiver apparatus 1 supplies power sources to the optical devices corresponding to Lane #1 to Lane #3, for example, and sends data using Lane #1 and Lane #2 without using Lane #3 since the amount of data becomes equal to or greater than the optical device threshold X3 and smaller than the lane threshold Y3. This enables the transceiver apparatus 1 to supply power sources to the optical devices corresponding to Lane #3 in advance, for preparing for data transmission using Lane #3.

As described above, when the amount of data is equal to or greater than the lane threshold Y2 and is less than the lane threshold Y3, the transceiver apparatus 1 executes data transmission using two parallel transmission channels (2-CH transmission bandwidth).

Next, at $t5 \leq t \leq t7$, the transceiver apparatus 1 sends data using Lane #1 to Lane #3, for example, since the amount of data becomes equal to or greater than the lane threshold Y3.

On the other hand, at $t=t6$, the amount of data starts to reduce at $t7 \leq t < t8$, the transceiver apparatus 1 continues to supply power sources to the optical devices corresponding to Lane #1 to Lane #3 while halting distributing data to Lane #3, and sends data using Lane #1 and Lane #2 since the amount of data is less than the lane threshold Y3 and is equal to or greater than the optical device threshold X3. This makes it possible to use Lane #3 immediately when the amount of data is increased again.

Subsequently, at $t8 \leq t \leq t9$, the transceiver apparatus 1 halts a power source supply to optical devices corresponding to Lane #3, and executes data transmission using Lane #1 and Lane #2 since the amount of data becomes less than the optical device threshold X3 and equal to or greater than the lane threshold Y2.

It is noted that, since the time duration required to activate optical devices are substantially fixed time durations, the values of the optical device thresholds Xi and the lane thresholds Yi are set such that the difference between them is greater when the change in the amount of data is steep. This helps to prevent data frame drop, thereby ensuring that data transmission is reliably executed. On the other hand, the values of the optical device threshold Xi and the lane threshold Yi may be set such that the level between them becomes smaller when the change in the amount of data is gentle. This makes it possible to reduce the time duration until data transmission using parallel transmission channels becomes available after the completion of activation of optical devices.

Moreover, the above-described optical device threshold Xi and lane threshold Yi may be dynamically changed based on the amount of data traffic or the number of wavelengths of data in the past, or may be fixed values, irrespective of the amount of data traffic or the like.

Furthermore, the transceiver apparatus 1 may issue a back pressure to restrict inputs and generation of data on the system side when the usage rate of the memory devices 23 reaches a predetermined threshold.

As described above, according to the transceiver apparatus 1 in this example, since the number of optical devices and the number of lanes that are to be used may be changed and controlled in accordance with the amount of inputted data, the apparatus may be configured flexibly in accordance with the amount of data.

Furthermore, since the transceiver apparatus 1 in this example can halt supply of a power source to optical devices that are not used, the power consumption of the transceiver apparatus 1 can be reduced.

Furthermore, since the transceiver apparatus 1 in this example is adapted not to distribute data to optical devices that are not used, it is ensured that data transmission using parallel transmission channels are reliably executed.

(1.6) Example of Configuration of Reception Control Section 15

Next, one example of the configuration of the reception control section 15 will be described with reference to FIG. 11.

Figure 11:
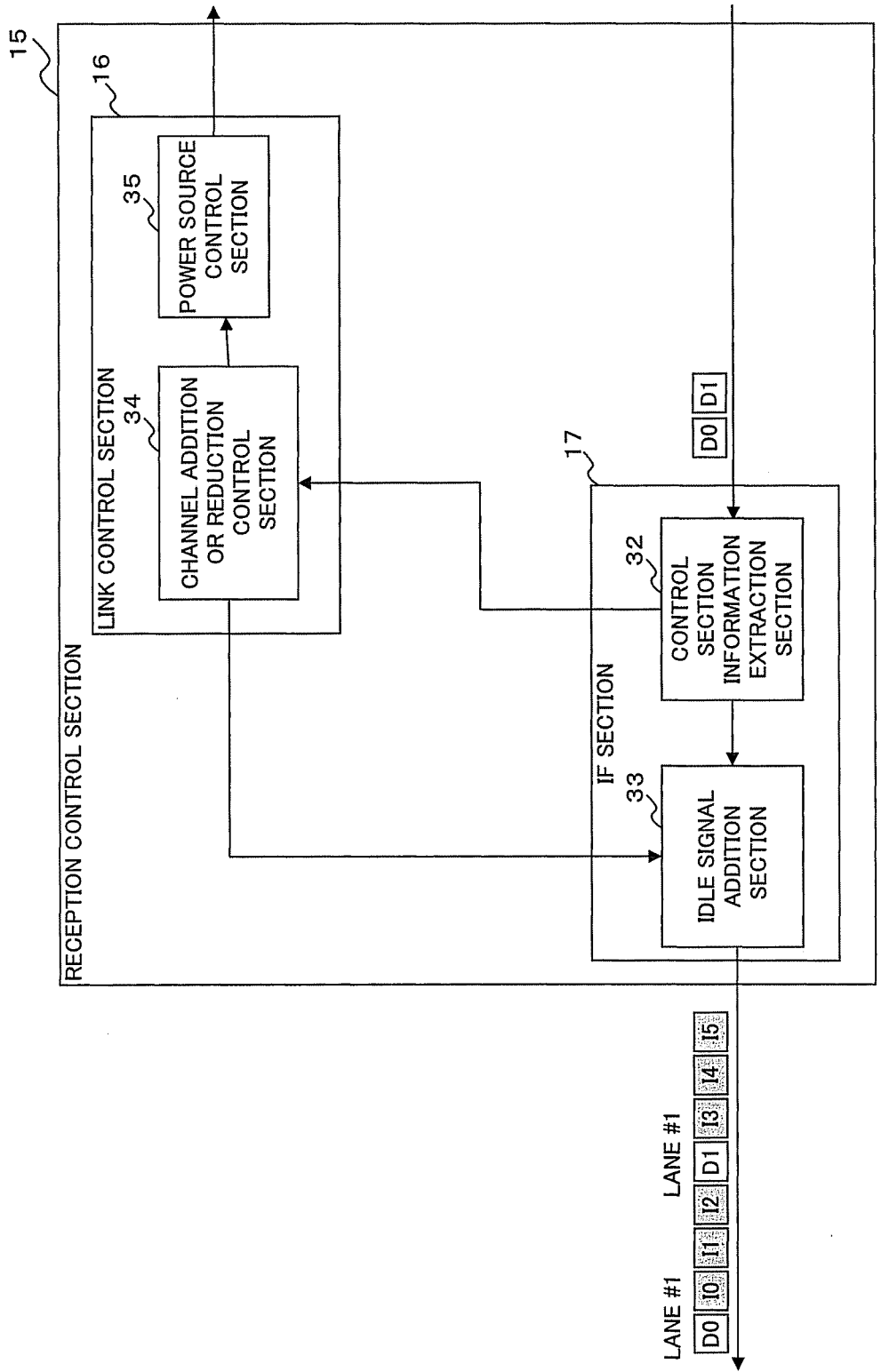
FIG. 11 is a diagram illustrating one example of the configuration of a reception control section.

As depicted in FIG. 11, the reception control section 15 may include a link control section 16 and an IF section 17, for example.

The IF section 17 extracts control information divided data that is received from the counterpart transceiver apparatus 1B through a plurality of parallel transmission channels. Furthermore, the IF section 17 adds (inserts) an idle signal to the received divided data to generate a serial signal string, and sends out the serial signal string to the system side.

For this purpose, the IF section 17 may include a control information extraction section 32 and an idle signal addition section 33, for example.

The control information extraction section 32 extracts control information from a transmission frame received from the counterpart transceiver apparatus 1B through the plurality of parallel transmission channels, and sends out the control information to the channel addition or reduction control section 34. Since control information is located before the frame start signal "s" or after the frame termination signal "t", for example, as described previously with reference to FIG. 6A, the control information extraction section 32 can extract such control information by detecting timing of their locations. Furthermore, the divided data (D0, D1) included in the transmission frame, from which the control information is removed by the control information extraction section 32, is sent out to the idle signal addition section 33.

The idle signal addition section 33 adds idle signals (I0-I5) to the divided data (D0, D1) inputted from the control information extraction section 32 to generate a serial signal string, and sends it out to the system side. Upon generating, the idle signal addition section 33 determines the locations of the idle signals (I0-I5) based on control from the channel addition or reduction control section 34. For example, in response to receiving a transmission frame on parallel transmission channels other than the parallel transmission channels which are determined by the channel addition or reduction control section 34 to be used, the idle signal addition section 33 adds idle signals (I0-I5) at the locations (timings) where idle signals are to be received. This enables the system side to execute data processing without recognizing the change in the configuration of the transceiver apparatus 1.

The link control section 16 determines parallel transmission channels to be used based on the control information provided from the IF section 17, and controls power source supplies to the respective receiving components (an optical receiving sections 11, the separation section 12, an transmission path decode sections 13, and an frame termination sections 14), based on this determination. Furthermore, the link control section 16 controls positions for adding idle signals by the idle signal addition section 33 based on the determination.

For this purpose, the link control section 16 may include a channel addition or reduction control section 34 and a power source control section 35, for example.

The channel addition or reduction control section 34 determines addition or reduction of a parallel transmission channel based on the control information. For example, the channel addition or reduction control section 34 determines the number of parallel transmission channels that are to be used according to the value of an Ack signal included in the control signal, as described previously in detail with reference to FIG. 6B. Furthermore, the channel addition or reduction control section 34 provides the power source control section 35 with the determination result. Furthermore, the channel addition or reduction control section 34 sends out the determination result to the idle signal addition section 33.

Based on the notification from the channel addition or reduction control section 34, the power source control section 35 supplies power sources to receiving components (an optical receiving section 11, the separation section 12, a transmission path decode section 13, and a frame termination section 14) corresponding to the parallel transmission channels to be used. On the other hand, the power source control section 35 does not supply a power source (or halt supply of a power source) to receiving components which do not correspond to the parallel transmission channel that are determined to be used.

That is, the power source control section 35 functions as one example of a power source control section that, based on the control information received from the IF section 17, supplies power sources to frame termination sections 14-1 to 14-$m$, transmission path encode section 13-1 to 13-$m$, and optical receiving sections 11-1 to 11-$n$, which correspond to at least one parallel transmission channel to be used from the frame termination sections 14-1 to 14-$m$, the transmission path encode section 13-1 to 13-$m$, and the optical receiving sections 11-1 to 11-$n$, and does not supply a power source to others which do not correspond to the at least one parallel transmission channel to be used.

This enables the reception control section 15 in this example to control power source supplies to receiving components in the local station 1 based on the control information transferred from the counterpart transceiver apparatus 1B. Thereby, the transceiver apparatus 1 can reduce the power consumptions of the receiving components.

As described above, the transceiver apparatus 1 in this example can significantly reduce the power consumption by the components on the receiving side based on the control information provided from the counterpart transceiver apparatus 1B (or 1A). As a result, it becomes possible to significantly reduce the power consumption by the transceiver apparatus 1.

(1.7) Example of Operation of Transceiver Apparatus 1

Next, a variation of the power source control section in the transceiver apparatus 1 will be described.

Figure 12:
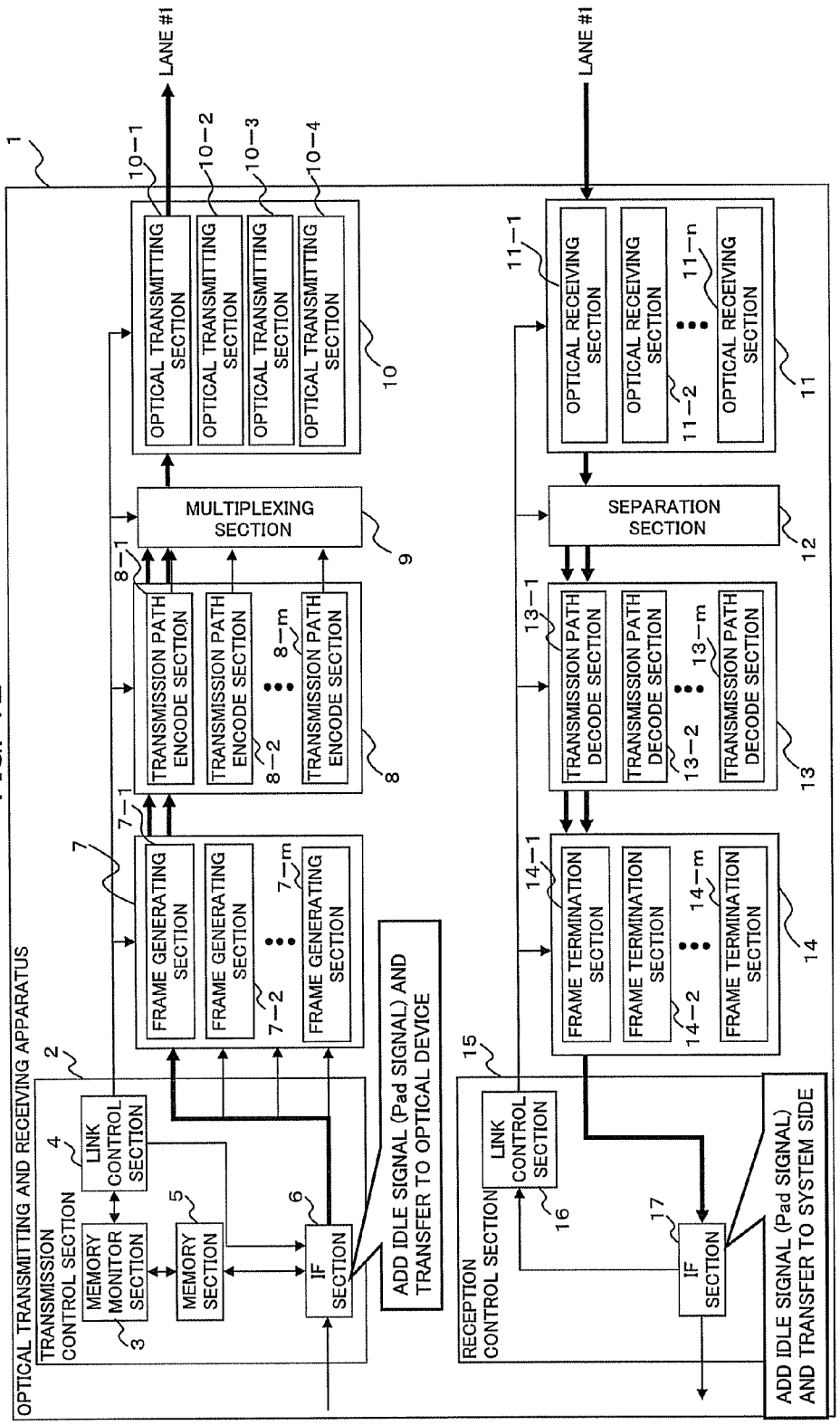
FIG. 12 is a diagram illustrating one example of the operation of the transceiver apparatus depicted in FIG. 4.

FIG. 12 is a diagram illustrating one example of the operation of the transceiver apparatus 1 in which the connections from MAC processing sections (the frame generation sections 7 or the frame termination sections 14) to the optical transmitting or receiving sections 10 and 11 are lane multiplexed (in the serial manner).

The transceiver apparatus 1 depicted in FIG. 12 supplies power sources to transmitting components (the frame generation section 7-1, the transmission path encode section 8-1, the multiplexing section 9, and the optical transmitting section 10-1) corresponding to the parallel transmission channel that is determined by the transmission control section 2 to be used (Lane #1 in FIG. 12), while not supplying a power source to other transmitting components (the frame generation sections 7-2 to 7-$m$, the transmission path encode section 8-2 to 8-$m$, and the optical transmitting section 10-2 to 10-$n$).

Subsequently, by the transmission control section 2, data and control signals are distributed to the transmitting components corresponding to the parallel transmission channel to be used (Lane #1) while idle signals (Pad signals) are distributed to the transmitting components corresponding to parallel transmission channels that are not to be used (Lane #2 to #n).

Furthermore, in the example depicted in FIG. 12, the frame generation section 7-1 generates only a transmission frame containing data and control signals, and sends the generated transmission frame to the counterpart transceiver apparatus 1B via Lane #1.

On the other hand, on the receiving side, the transceiver apparatus 1 supplies power sources to receiving components (the optical receiving section 11-1, the separation section 12, the transmission path decode section 13-1, and the frame termination section 14-1) corresponding to the parallel transmission channel notified by the control information (for example, Lane #1), while not supplying a power source to other receiving components (the optical receiving section 11-2 to 11-$n$, the transmission path decode section 13-2 to 13-$m$, and the frame termination section 14-2 to 14-$m$).

Subsequently, by the reception control section 15, idle signals are added to generate a serial signal string, and the generated serial signal string is sent out to the system side.

Figure 13:
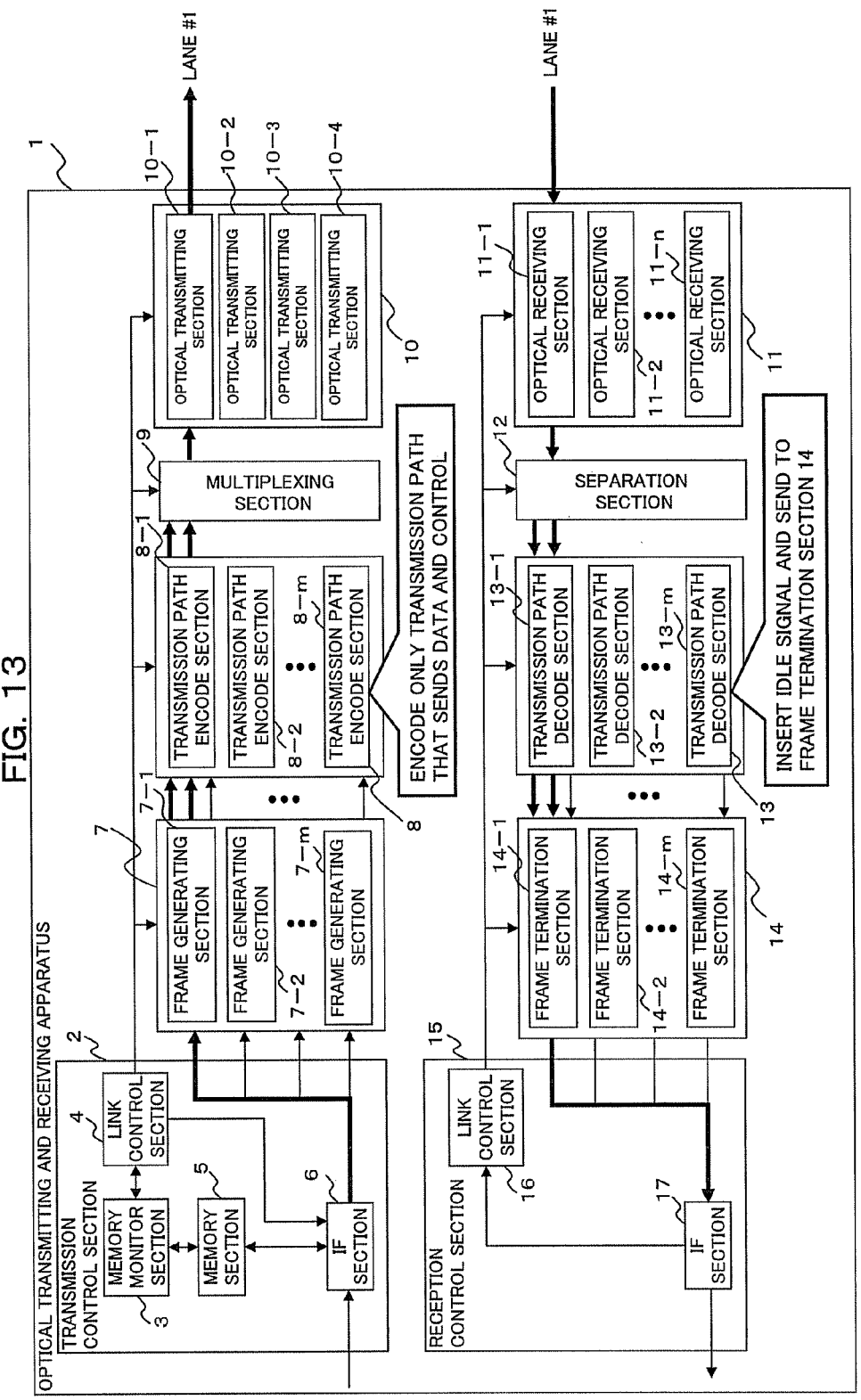
FIG. 13 is a diagram illustrating one example of the operation of the transceiver apparatus depicted in FIG. 4.

FIG. 13 is a diagram illustrating one example of the operation of the transceiver apparatus 1 in which the connections from PSC processing sections (the transmission path encode sections 8 or the transmission path decode sections 13) to the optical transmitting or receiving sections 10 and 11 are lane multiplexed (in the serial manner). Such a transceiver system includes the XAUIs of 10 GbE, for example.

The transceiver apparatus 1 depicted in FIG. 13 supplies power sources to transmitting components (the frame generation section 7-1, the transmission path encode section 8-1, the multiplexing section 9, and the optical transmitting section 10-1) corresponding to the parallel transmission channel that is determined by the transmission control section 2 to be used (Lane #1 in FIG. 13), while not supplying a power source to other transmitting components (the transmission path encode section 8-2 to 8-$m$ and the optical transmitting section 10-2 to 10-$n$).

Subsequently, by the transmission control section 2, data and control signals are distributed to the transmitting components corresponding to the parallel transmission channel to be used (Lane #1) while idle signals are distributed to the transmitting components corresponding to parallel transmission channels that are not to be used (Lanes #2 to #n).

Furthermore, in the example depicted in FIG. 13, the frame generation section 7-1 generates a transmission frame containing data and control signals while the frame generation sections 7-2 to 7-$m$ generate transmission frames containing idle signals. The transmission frames sent out from the respective frame generation sections 7-1 to 7-$m$ are inputted to the transmission path encode sections 8-1 to 8-$m$. No channel encoding processing is executed on the transmission frames generated by the frame generation sections 7-2 to 7-$m$, and only the transmission frame generated by the frame generation section 7-1 is encoded.

On the other hand, on the receiving side, the transceiver apparatus 1 supplies power sources to receiving components (the optical receiving section 11-1, the separation section 12, the transmission path decode section 13-1, and the frame termination section 14-1) corresponding to the parallel transmission channel notified by the control information (for example, Lane #1), while not supplying a power source to other receiving components (the optical receiving section 11-2 to 11-$n$ and the transmission path decode section 13-2 to 13-$m$).

In this case, idle signals are added by the transmission path decode section 13, instead of by the reception control section 15, termination is executed by the frame termination section 14, and the frame is sent out to the reception control section 15.

Subsequently, the reception control section 15 generates a serial signal string and sends out the string to the system side.

This enables the transceiver apparatus 1 exemplified in FIG. 13 to fully utilize the transmission bandwidth by means of idle signals.

It is noted that, as another variation, a power source may not be supplied to only optical transmitting and receiving sections 10 and 11 that correspond to parallel transmission channel that are not to be used, for example.

(2) First Variant

The examples have been described previously in which power source supplies to the transmitting components (the frame generation sections 7, the transmission path encode sections 8, the multiplexing section 9, and the optical transmitting sections 10) or the receiving components (the optical receiving sections 11, the separation section 12, the transmission path decode sections 13, and the frame termination sections 14) in the transceiver apparatus 1 are controlled in accordance with the amount of data, thereby reducing the power consumption.

Alternatively, as in this example, the power consumption by the memory section 5 can be reduced by controlling power source supplies to a plurality of memory devices 23$a$ to 23$d$ in accordance with the amount of inputted data.

Figure 14:
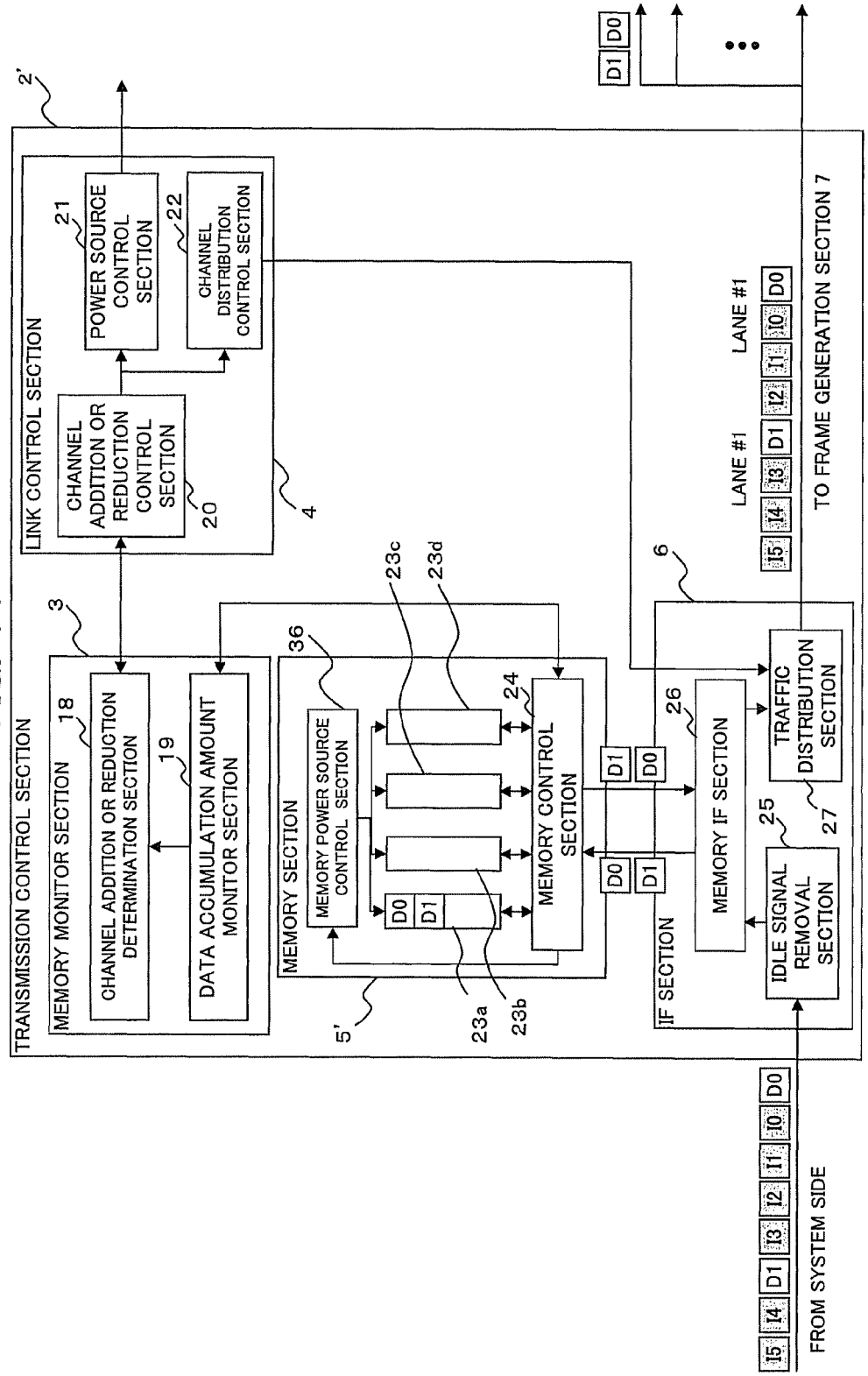
FIG. 14 is a diagram illustrating one example of the configuration of a transceiver apparatus according to a first variant.

One example of the configuration of a transmission control section 2' in this example is depicted in FIG. 14.

As depicted in FIG. 14, the transmission control section 2' may include an IF section 6, a memory section 5', a link control section 4, and a memory monitor section 3, for example. The memory section 5' may include, a memory control section 24, memory devices 23$a$ to 23$d$ that store (contain) divided data, and a memory power source control section 36, for example. It is noted that the number of memory devices 23$a$ to 23$d$ are not limited to that in the example depicted in FIG. 14. Furthermore, the components having the like reference numerals have the similar functions as those of the components described above.

The memory control section 24 determines at least one memory device 23$a$ to 23$d$ to be used from the memory devices 23$a$ to 23$d$ in accordance with the amount of inputted data.

The memory power source control section 36 controls a power source supply to the memory devices 23$a$ to 23$d$, based on the control from the memory control section 24.

For example, the amount of data is compared against the respective memory thresholds Zb, Zc, and Zd ($0<Zb<Zc<Zd$) by the memory control section 24, and at least one memory device 23$a$ to 23$d$ to be used is determined based on the comparison result. For example, the memory control section 24 determines that only the memory device 23a is to be used when the amount of data is less than Zb, or determines that the memory devices 23a and 23b are to be used when the amount of data is equal to or greater than Zb and less than Zc. Furthermore, the channel addition or reduction control section 20 determines to supply power only to the memory devices 23a to 23c when the amount of data is equal to or greater than Zc and less than Zd, and determines to supply power to the memory devices 23a to 23d when the amount of data is equal to or greater than Zd. It is noted that the above controls are merely exemplary, and a power source may be supplied to a number memory of devices 23, the number of which are determined dependent on the amount of data, for example.

Subsequently, the memory power source control section 36 supplies power sources to memory devices 23a to 23d that are determined by the memory control section 24 to be used, and does not supply a power source to memory devices 23a to 23d that are not determined by the memory control section 24 to be used.

Figure 15:
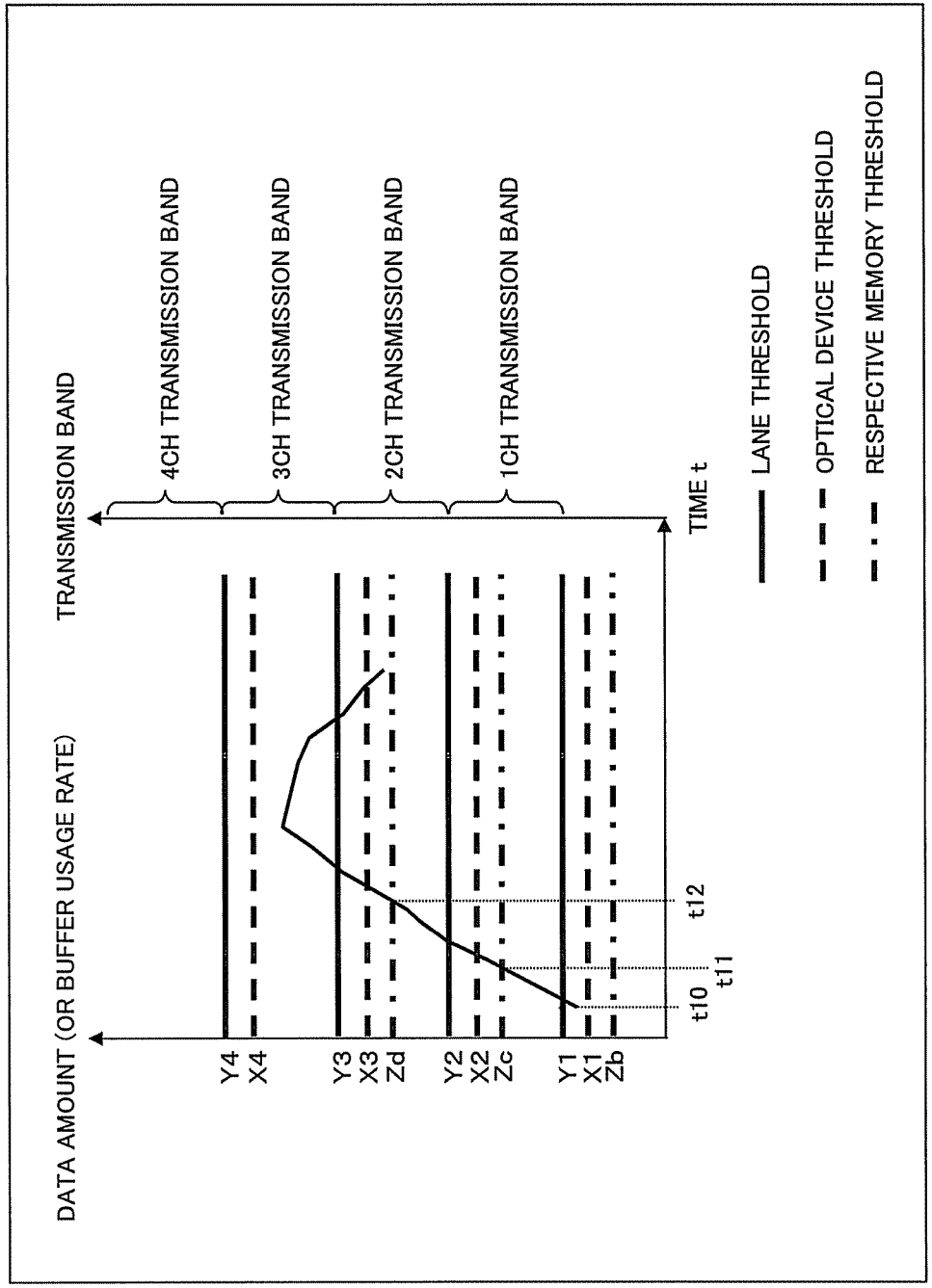
FIG. 15 is a diagram illustrating an example of the change in the data amount over time.

FIG. 15 is a diagram illustrating one example of the change in the data amount (or the buffer usage rate) over time. It is noted that t10 to t12 are constants satisfying the following relationship: $0 \leq t10 < t11 < t12$.

Firstly, at $t10 \leq t < t11$, since the amount of data is equal to or greater than the respective memory threshold Zb and less than the respective memory threshold Zc, the memory power source control section 36 supplies power sources to the memory devices 23a and 23b and does not supply a power source to the memory devices 23c and 23d.

Next, at $t11 \leq t < t12$, since the amount of data is equal to or greater than the respective memory threshold Zc and less than the respective memory threshold Zd, the memory power source control section 36 supplies power sources to the memory devices 23a to 23c and does not supply a power source to the memory device 23c.

Subsequently, at $t \geq t12$, since the amount of data is equal to or greater than the respective memory threshold Zd, the memory power source control section 36 supplies power sources to the memory devices 23a to 23d.

As described above, since the transceiver apparatus 1 in this example can control a supply of a power source to the plurality of the memory devices 23a to 23d in accordance with the amount of inputted data, the power consumption can be further reduced.

(3) One Example of Transceiver System

Next, a transceiver system that concentrates a plurality of transceiver apparatuses 1 for sending and receiving data will be described.

For example, a transceiver system may be assumed, wherein 20 transceiver apparatuses 1 are concentrated, each of which achieves a link speed of 100 Gbps by using four 25-Gbps parallel transmission channels, thereby connecting to a transmission path of a 1-Tbps class.

The concentrator that concentrates 20 transceiver apparatuses 1 used in such a transceiver system includes at least 80 (=4×20) optical modules, for four parallel transmission channels used by the 20 transceiver apparatuses 1, for example.

Note that the number of parallel transmission channels used by one transceiver apparatus 1 is not limited to four. For example, each transceiver apparatus 1 may use ten 10-Gbps parallel transmission channels for achieving an overall link speed of 100 Gbps, for example. Note that the concentrator in a transceiver system that concentrates such transceiver apparatuses 1 includes at least 200 (=10×20) optical modules.

Figure 16:
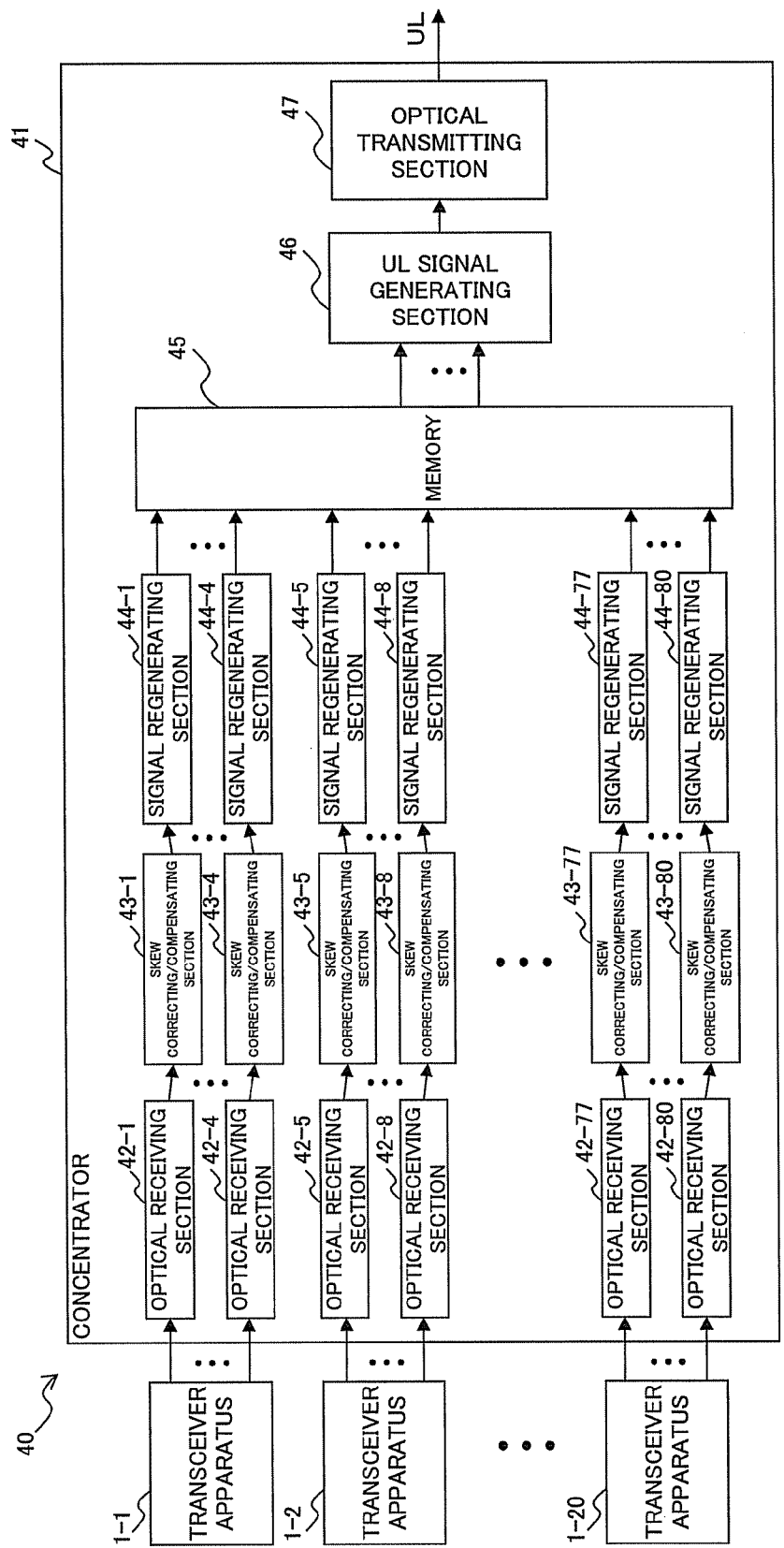
FIG. 16 is a diagram illustrating one example of the configuration of a transceiver system.

Referring to FIG. 16, one example of the configuration of the above-described transceiver system is depicted.

A transceiver system 40 depicted in FIG. 16 may include 20 transceiver apparatuses 1-1 to 1-20 and a concentrator 41, for example. Note that, hereinafter, if there is no distinction among the transceiver apparatus 1-1 to 1-20 is necessary, they may be simply refereed to as "transceiver apparatuses 1." In addition, it should be noted that the number of transceiver apparatuses 1 is not limited to the number illustrated in FIG. 16.

A transceiver apparatus 1 may include a transmission control section 2, a frame generation section 7, a transmission path encode section 8, a multiplexing section 9, and an optical transmitting section 10 depicted in FIG. 5, for example, as set forth previously. Herein, the respective functions of the transmission control section 2, the frame generation section 7, the transmission path encode section 8, the multiplexing section 9, and the optical transmitting section 10 are same as those described above, and the descriptions thereof will be omitted.

More specifically, the transceiver apparatuses 1 include a function to determine at least one parallel transmission channel from a plurality of parallel transmission channels in accordance with the amount of data, and to supply a power source to a transmitting section that sends divided data using the determined parallel transmission channel while not supplying a power source to a transmitting section that does not send the divided data.

In addition, the concentrator 41 concentrates the plurality of transceiver apparatuses 1 towards a transmission path on the uplink (UL) side or a transceiver system on the UL side. That is, the concentrator 41 includes a function to generate a UL signal based on data from the plurality of transceiver apparatuses 1 and send the generated UL signal to the UL side.

For this purpose, the concentrator 41 may include optical receiving sections 42-1 to 42-80, skew correcting/compensating sections 43-1 to 43-80, signal regenerating sections 44-1 to 44-80, a memory 45, a UL signal generating section 46, and an optical transmitting section 47, for example. Note that, hereinafter, if there is no distinction among the optical receiving sections 42-1 to 42-80 is necessary, they may be simply refereed to as "optical receiving sections 42". If there is no distinction among the skew correcting/compensating sections 43-1 to 43-80 is necessary, they may be simply refereed to as "skew correcting/compensating sections 43". If there is no distinction among the signal regenerating sections 44-1 to 44-80 is necessary, they may be simply referred to as "signal regenerating sections 44". In addition, it should be understood that the numbers of optical receiving sections 42, skew correcting/compensating sections 43, and signal regenerating sections 44 are not limited to those illustrated in FIG. 16.

An optical receiving section 42 receives data sent from the transceiver apparatus 1 and sends it out to the skew correcting/compensating section 43. In other words, the optical receiving section 42 is a client interface with the transceiver apparatus 1.

A skew correcting/compensating section 43 executes a skew correction on the data from the optical receiving section 42. A skew may be attributable to a variety of causes, such as the difference in lengths of transmission paths between the transceiver apparatus 1-1 to 1-20 and the concentrator 1, the difference in wavelengths of light used by respective transceiver apparatuses 1. The skew correcting/compensating section 43 corrects any discrepancies among data received from respective transceiver apparatuses 1 based on information related to the above-listed causes, for example. The data that undergoes the skew correction/compensation processing by the skew correcting/compensating section 43 is sent out to the signal regenerating section 44.

The signal regenerating section 44 executes signal regeneration processing on the data from the skew correcting/compensating section 43. In this example, the "signal regeneration processing" refers to a function to regenerate data that has been divided upon the parallel transmission to the original data. The data that undergoes the signal regeneration processing by the signal regenerating section 44 is sent out to the memory 45.

The memory 45 reorders data from the signal regenerating section 44 for each transceiver apparatus 1, and sends it out to the UL signal generating section 46.

The UL signal generating section 46 then generates a UL signal based on the data from the memory 45. For example, the UL signal generating section 46 executes a parallel/serial conversion on the data from the memory 45 to concentrate the data. The UL signal generating section 46 then generates a UL signal by executing format conversion processing or the like on the collected data, in accordance with the transmission format used in the transmission path used on the UL side or the transceiver system on the UL side, for example. The UL signal generated by the UL signal generating section 46 is sent out to the optical transmitting section 47.

The optical transmitting section 47 executes predetermined optical transmission processing on the UL signal from the UL signal generating section 46, and sends the signal to the transmission path on the UL side or the transceiver system on the UL side.

As described above, the transceiver system 40 can concentrate the plurality of transceiver apparatuses 1 towards the UL side.

It is noted that power consumption may be increased when the traffic is low or when the system is on standby, since the above transceiver system 40 operates the optical modules 42-1 to 42-80, 43-1 to 43-80, and 44-1 to 44-80, for 4×20 parallel transmission channels.

In addition, in general, the case in which all of the transceiver apparatuses 1 experience a traffic load of 100 Gbps is unlikely. That is, the probability of the transceiver system 40 experiencing a traffic of 2 Tbps (=100 Gbps×20) is quite low, and accommodating a traffic in a half of this load, i.e., a traffic of 1 Tbps, is sufficiently practical.

In view of the above, a technique to reduce the power consumption in a transceiver system that concentrates a plurality of transceiver apparatuses 1 will be discussed hereinafter.

(3.1) Example of Configuration of Transceiver System

Figure 17:
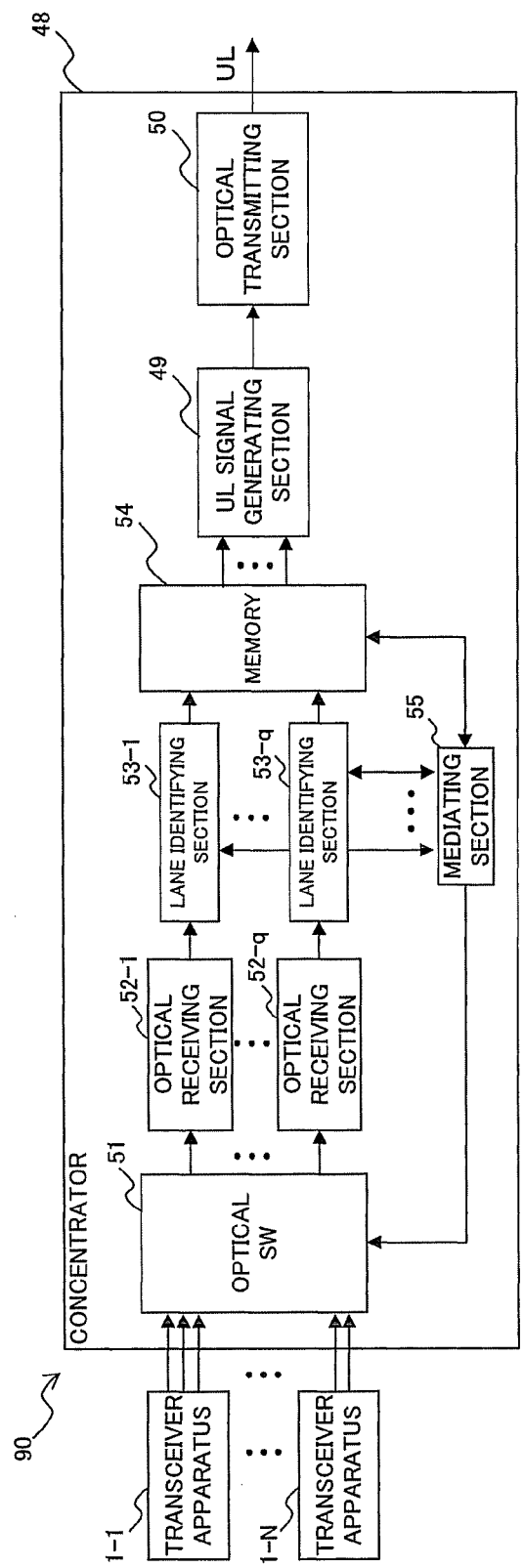
FIG. 17 is a diagram illustrating one example of the configuration of a transceiver system.

Referring to FIG. 17, one example of the configuration of a transceiver system 90 is depicted.

The transceiver system 90 depicted in FIG. 17 may include a plurality of transceiver apparatuses 1-1 to 1-N (N is an integer of 2 or greater), and a concentrator 48, for example. Note that, hereinafter, if no distinction among the transceiver apparatus 1-1 to 1-N is necessary, they may be simply referred to as "transceiver apparatuses 1".

In this example, as described previously, the transceiver apparatuses 1 includes a function to determine at least one parallel transmission channel from a plurality of parallel transmission channels in accordance with the amount of data, and to supply a power source to a transmitting section that sends divided data using the determined parallel transmission channel while not supplying a power source to a transmitting section that does not send the divided data.

In addition, the transceiver apparatuses 1 each include n optical transmitting sections 10, for example. That is, each of the transceiver apparatuses 1 is connected to a concentrator 48 via n parallel transmission channels.

Furthermore, each transceiver apparatus 1 can send control information on the parallel transmission channel which the transceiver apparatus 1 is using, together with data. Note that the control information may include information on addition or deletion of a parallel transmission channel, which is determined to be used from the plurality of parallel transmission channels in accordance with the amount of transmission data, or may include information on a parallel transmission channel which is determined not to be used from the plurality of parallel transmission channels in accordance with the amount of the transmission data.

Furthermore, the control information may be included in the header part of a transmission frame sent by the transceiver apparatuses 1. Moreover, the above control information may be sent on at least one parallel transmission channel, and the control information may be sent on the parallel transmission channel which is assuredly used by a transceiver apparatus.

Note that an example of the arrangement of the control information has been described with reference to FIG. 6.

The concentrator 48 concentrates the N transceiver apparatuses 1 towards a transmission path on the UL side or a transceiver system on the UL side. The concentrator 48, in this example, concentrates data from the N transceiver apparatuses 1 to generate a UL signal, and sends the generated UL signal to the UL side, for example.

In this example, the concentrator 48 may include an optical switch (optical SW) 51, optical receiving sections 52-1 to 52-q (q is an integer of 2 or greater), lane identifying sections 53-1 to 53-q, a memory 54, a mediating section 55, a UL signal generating section 49, and an optical transmitting section 50, for example. Note that, hereinafter, if there is no distinction among optical receiving sections 52-1 to 52-q are necessary, they may be simply refereed to as "optical receiving sections 52". If no distinction among the lane identifying sections 53-1 to 53-q is necessary, they may be simply refereed to as "lane identifying sections 53".

The optical SW 51 relays data from the transceiver apparatuses 1 to the optical receiving sections 52.

The optical SW 51 in this example includes N×n input ports, each of which is connected to one of the N transceiver apparatuses 1 via n parallel transmission channels, and a plurality of output ports selectively connected to the N×n input ports, the number of which is smaller than the number of the N×n input ports.

For example, the above plurality of output ports may include N first output ports, which are respectively connected to the N transceiver apparatuses via N input ports from the N×n input ports, and p second output ports which may be selectively connected to (N−1)×n input ports other than the above N input ports (p is a natural number satisfying p<N×(n−1)).

In such a case, each of the transceiver apparatuses 1 includes one static parallel transmission channel (main lane), for example, wherein the respective main lanes may be connected to the N first output ports via the N input ports from the N×n input ports in the optical SW 51.

Furthermore, each of the transceiver apparatuses 1 includes at least one variable parallel transmission channel (variable lane) other than the main lane, for example, wherein variable lanes may be connected to the p second output port via the (N−1)×n input ports other than the above N input ports that are connected to the main lanes.

That is, a plurality of parallel transmission channels used by a transceiver apparatus 1 are classified into the main lane for sending data containing the above-described control information, and variable lane(s), and the number of the variable lane(s) to be used is varied in accordance with the amount of data.

Thereby, a transceiver apparatus 1 can determine the number of parallel transmission channels that are to be used in accordance with the amount of transmission data, and send control information on the parallel transmission channels that are to be used to the concentrator 48 via the main lane, for example. Note that the control information from the transceiver apparatus 1 may be provided to the UL side, for example. Thereby, the transceiver system or the like on the UL side can increase or decrease the number of parallel transmission channels to be used on the UL side, based on the control information.

In addition, an optical receiving section 52 receives the data sent from a transceiver apparatus 1 and sends it out to the lane identifying section 53. In other words, the optical receiving section 52 is a client interface with the transceiver apparatus 1.

The lane identifying section 53 extracts a link number and a lane number from the data received by the optical receiving section 52 from the transceiver apparatus 1. Based on the link number and the lane number that are extracted, the lane identifying section 53 identifies via which parallel transmission channel of which transceiver apparatus 1 the data has been sent.

In this example, the link number is one example of various types of identification information of a transceiver apparatus 1 included in each of a plurality of pieces of data that are sent by the transceiver apparatus 1 via a parallel transmission channel, and the lane number is one example of various types of identification information of that parallel transmission channel, which is included in each of a plurality of pieces of data that are sent via the parallel transmission channel by the transceiver apparatus 1.

In addition, the lane identifying section 53 extracts the control information included in data sent from the transceiver apparatus 1, and identities an addition or deletion request of a parallel transmission channel from the transceiver apparatus 1.

Figure 18:
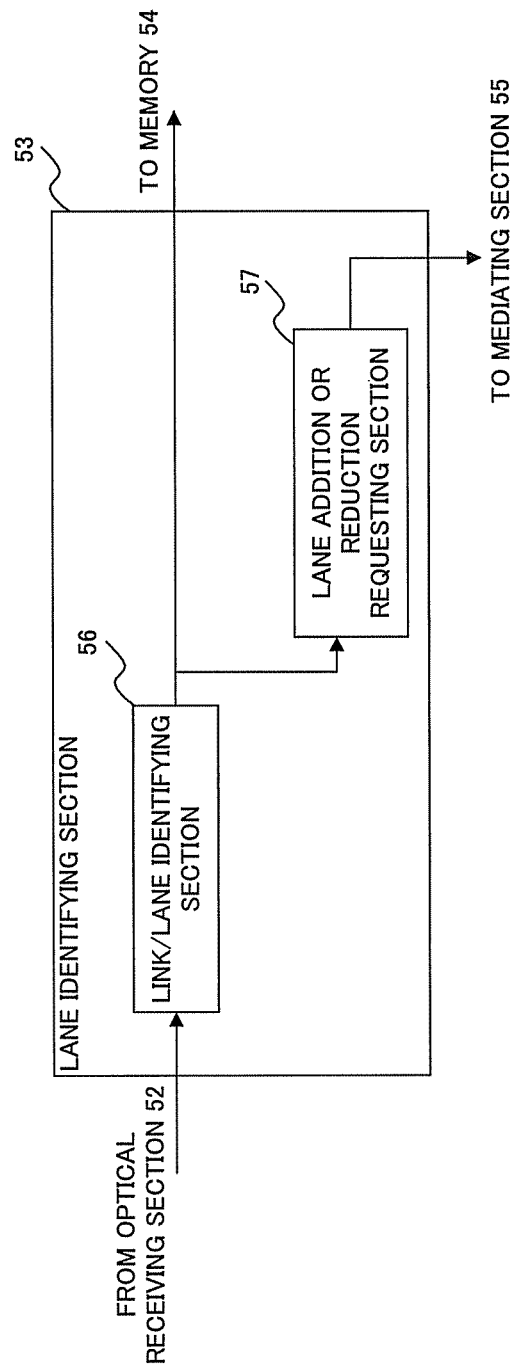
FIG. 18 is a diagram illustrating one example of the configuration of a lane identifying section depicted in FIG. 17.

For this purpose, a lane identifying section 53 includes a link/lane identifying section 56 and a lane addition or deletion request processing section 57, as illustrated in FIG. 18.

The link/lane identifying section 56 identifies of which transceiver apparatus 1 via which parallel transmission channel that data has been sent, based on the link number and the lane number included in data that has been received from a transceiver apparatus 1 by the optical receiving section 52. The identification result is provided to the memory 54 by the link/lane identifying section 56.

The lane addition or deletion request processing section 57 extracts the control information included in the data sent from the transceiver apparatus 1, detects an addition or deletion request of a parallel transmission channel from the transceiver apparatus 1. The detection result is provided to the mediating section 55 by the lane addition or deletion request processing section 57. Note that it is sufficient for lane addition or deletion request processing sections 57 to be provided to at least lane identifying sections 53 that are connected to the main lanes (for example, the lane identifying sections 53-1 to 53-20), since an addition or deletion request of a parallel transmission channel is sent via a main lane.

More specifically, the optical receiving sections 52 and the lane identifying sections 53 function as one example of a plurality of optical modules that are respectively connected to output ports of the optical SW 51 and process data sent from the N transceiver apparatuses 1.

In addition, the mediating section (control section) 55 controls a connection between an input port and an output port in the optical SW 51 based on the control information extracted by the lane identifying section 53. For example, the mediating section 55 controls a connection between an input port and an output port in the optical SW 51 based on an addition or deletion request of a parallel transmission channel from a transceiver apparatus 1 such that a parallel transmission channel that is to be used by the transceiver apparatus 1 is connected to the optical receiving section 52.

Figure 19:
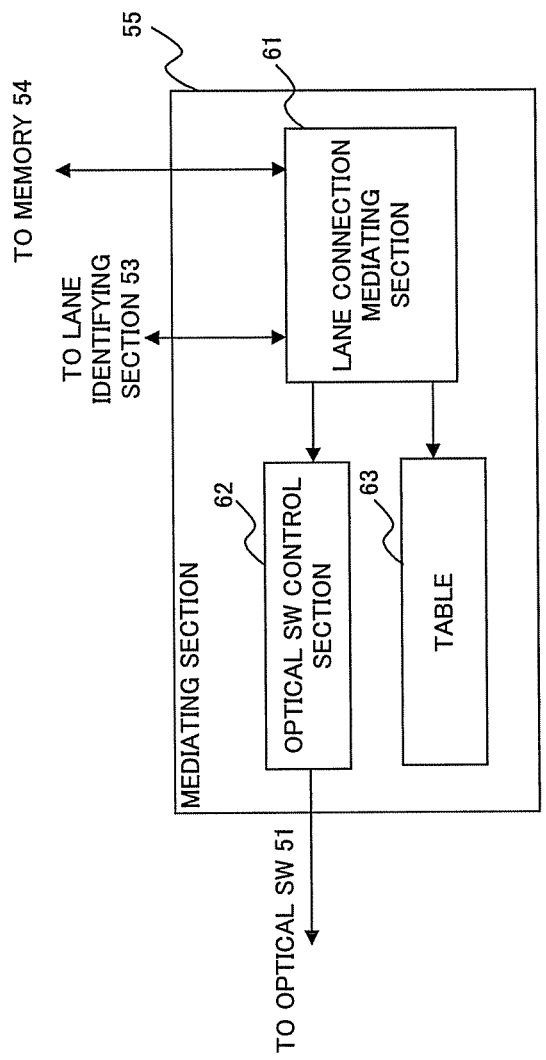
FIG. 19 is a diagram illustrating one example of the configuration of a mediating section depicted in FIG. 17.

For this purpose, the mediating section 55 includes a lane connection mediating section 61, an optical SW control section 62, and a table 63, as illustrated in FIG. 19.

The lane connection mediating section 61 figures out which transceiver apparatus 1 has requested addition or deletion of a parallel transmission channel based on the control information extracted by the lane identifying section 53 from data, and determines whether or not processing based on that request is possible, that is, whether or not addition or deletion of the lane is possible. The determination is made based on information stored in the table 63, for example.

The table 63 stores port numbers of output ports in the optical SW 51, related link numbers of transceiver apparatuses 1 that are the senders of data outputted by those output ports, and related lane numbers of parallel transmission channels on which the data is transmitted.

In addition, the table 63 stores the number of parallel transmission channels being used by each of the transceiver apparatuses 1.

Each pieces of information stored in the table 63 may be preset by a system administrator or the like, or may be set by the mediating section 55 by collecting information from the optical SW 51, for example.

Figure 20:
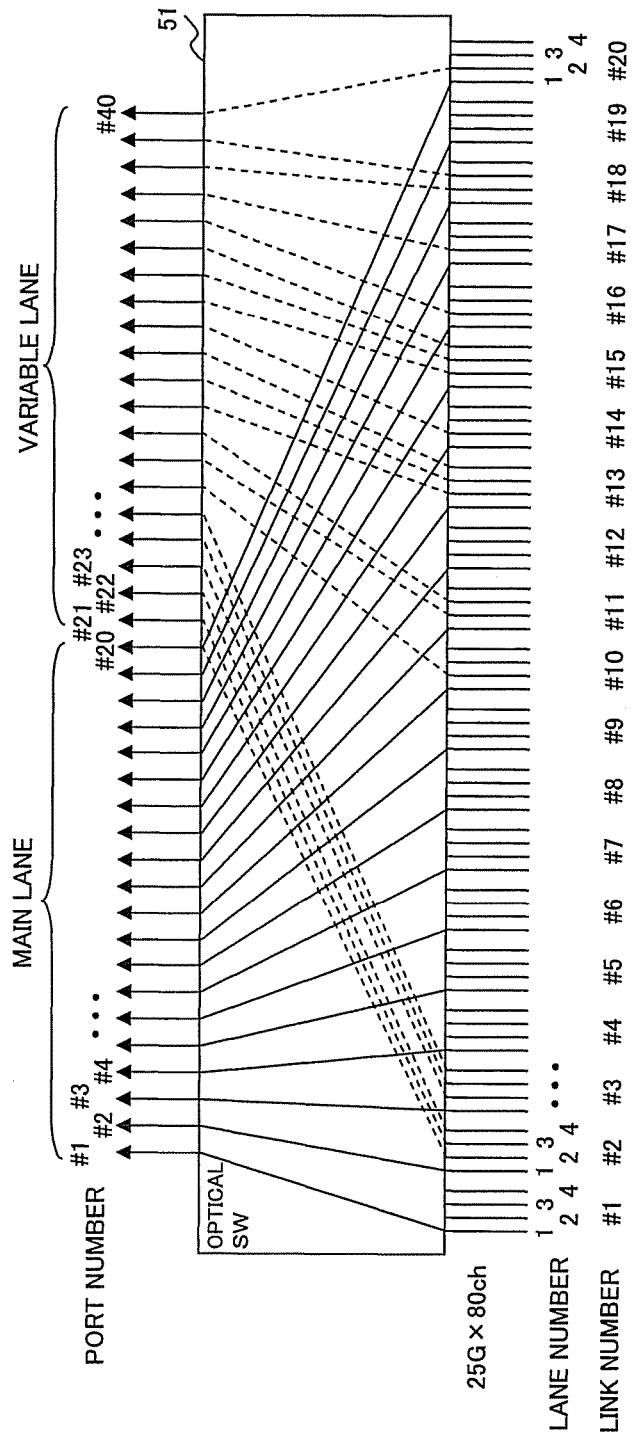
FIG. 20 is a diagram illustrating one example of the configuration of an optical SW depicted in FIG. 17.

Referring to FIG. 20, one example of connections in the optical SW 51 is depicted.

Input ports in the SW 51 depicted in FIG. 20, as one example, are connected to 20 transceiver apparatuses 1 that achieve a link speed of 100 Gbps by using four of 25-Gbps parallel transmission channels. More specifically, in the example depicted in FIG. 20, n is four and N is 20.

In addition, of four parallel transmission channels used by each of the transceiver apparatuses 1, the parallel transmission channel having Lane Number #1 is assigned as a main lane and the parallel transmission channels of Lane Numbers #2 to #4 are assigned as variable lanes.

Furthermore, the output ports of Port Numbers #1 to #20 in the optical SW 51 are assigned as first output ports connected to the respective main lanes, and the output ports of Port Numbers #21 to #40 are assigned as second output ports that may be connected to respective variable lanes.

Thus, in the example depicted in FIG. 21, the output ports of Port Numbers #1 to #20 in the optical SW 51 are connected to the respective main lanes of Lane Numbers #1 of the transceiver apparatuses 1-1 to 1-20 while some variable lanes of the transceiver apparatus 1-1 to 1-20 are connected to one of second output ports.

Figure 22:
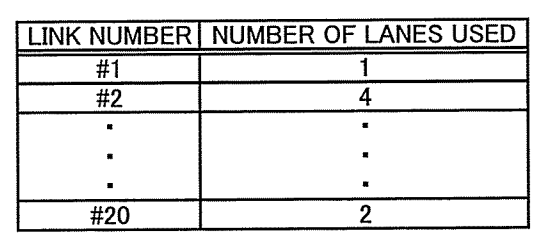

In this case, the table 63 contains information as depicted in FIG. 21 and FIG. 22.

The information indicated in FIG. 21 is one example of information of port numbers of output ports in the optical SW 51, related link numbers of transceiver apparatuses 1 that are the senders of data outputted by those output ports, and related lane numbers of parallel transmission channels on which the data is transmitted.

In the example depicted in FIG. 21, it is indicated that data outputted from the output port of Port Number #1 in the optical SW 51 is transmitted through the main lane (Lane Number #1) of the transceiver apparatus 1-1 (Link Number #1), and that data outputted from the output port of Port Number #2 is transmitted through the main lane (Lane Number #2) of the transceiver apparatus 1-2 (Link Number #2). In addition, it is indicated that data outputted from the output port of Port Number #20 in the optical SW 51 is transmitted through the main lane (Lane Number #20) of the transceiver apparatus 1-20 (Link Number #20), and that data outputted from the output ports of Port Numbers #21-23 is respectively transmitted through the variable lanes (Lane Number #2-4) of the transceiver apparatus 1-2 (Link Number #2). Furthermore, data outputted from the output port of Port Number #40 is transmitted through the variable lane (Lane Number #2) of the transceiver apparatus 1-20 (Link Number #20)

On the other hand, information depicted in FIG. 22 is one example of information on the numbers of parallel transmission channels being used by each of the transceiver apparatuses 1 (the numbers of lanes used).

In the example depicted in FIG. 22, it is indicated that the number of parallel transmission channels being used by the transceiver apparatus 1-1 (Link Number #1) is one, the number of parallel transmission channels being used by the transceiver apparatus 1-2 (Link Number #2) is four, and the number of parallel transmission channels being used by the transceiver apparatus 1-20 (Link Number #20) is two.

The lane connection mediating section 61, in response to a lane addition request from a transceiver apparatus 1, determines whether or not there is any output port (free port) is available for addition, based on information illustrated in FIG. 21 and FIG. 22 as described above.

The lane connection mediating section 61 permits addition of a lane to that transceiver apparatus 1 if there is any free port, and does not permit addition of a lane to that transceiver apparatus 1 if there is no free port.

In addition, the lane connection mediating section 61 may determine, in response to a lane deletion request from a transceiver apparatus 1, whether or not data is being transmitted on that lane.

The lane connection mediating section 61 does not permit deletion of the lane to a transceiver apparatus 1 when determining data is being transmitted through that lane for which the lane deletion is requested by the transceiver apparatus 1, and permits deletion of the lane when data is not being transmitted through that lane.

In addition, the lane connection mediating section 61 updates the table contents in accordance with the result of the above determination, and provides the determination result to the memory 54 and the optical SW control section 62.

The optical SW control section 62 controls switching of connections between input ports and output ports in the optical SW 51 based on the determination result from the lane connection mediating section 61.

In the manner as described above, the lane connection mediating section 61 in the mediating section 55 of this example can mediate a connection between an input port and an output port in the optical SW 51 based on a lane addition or deletion request from a transceiver apparatus 1.

In addition, the mediating section 55 can control a connection between an input port and a second output port in the optical SW 51 such that a variable lane used by a transceiver apparatus 1 is connected to one of second output ports in the optical SW 51.

Note that, when it is determined by the mediating section 55 that the lane addition is possible, information on an addition permission is sent to a transceiver apparatus 1 through its main lane. The transceiver apparatus 1 that receives the information on the addition permission adds a variable lane, and sends or receives data through that lane.

In contrast, it is determined by the mediating section 55 that the lane deletion is possible, information on a deletion permission is sent to the transceiver apparatus 1 through its main lane. The transceiver apparatus 1 that receives the information on the deletion permission deletes a variable lane, and stops transmission of reception of data through that lane.

Figure 23:
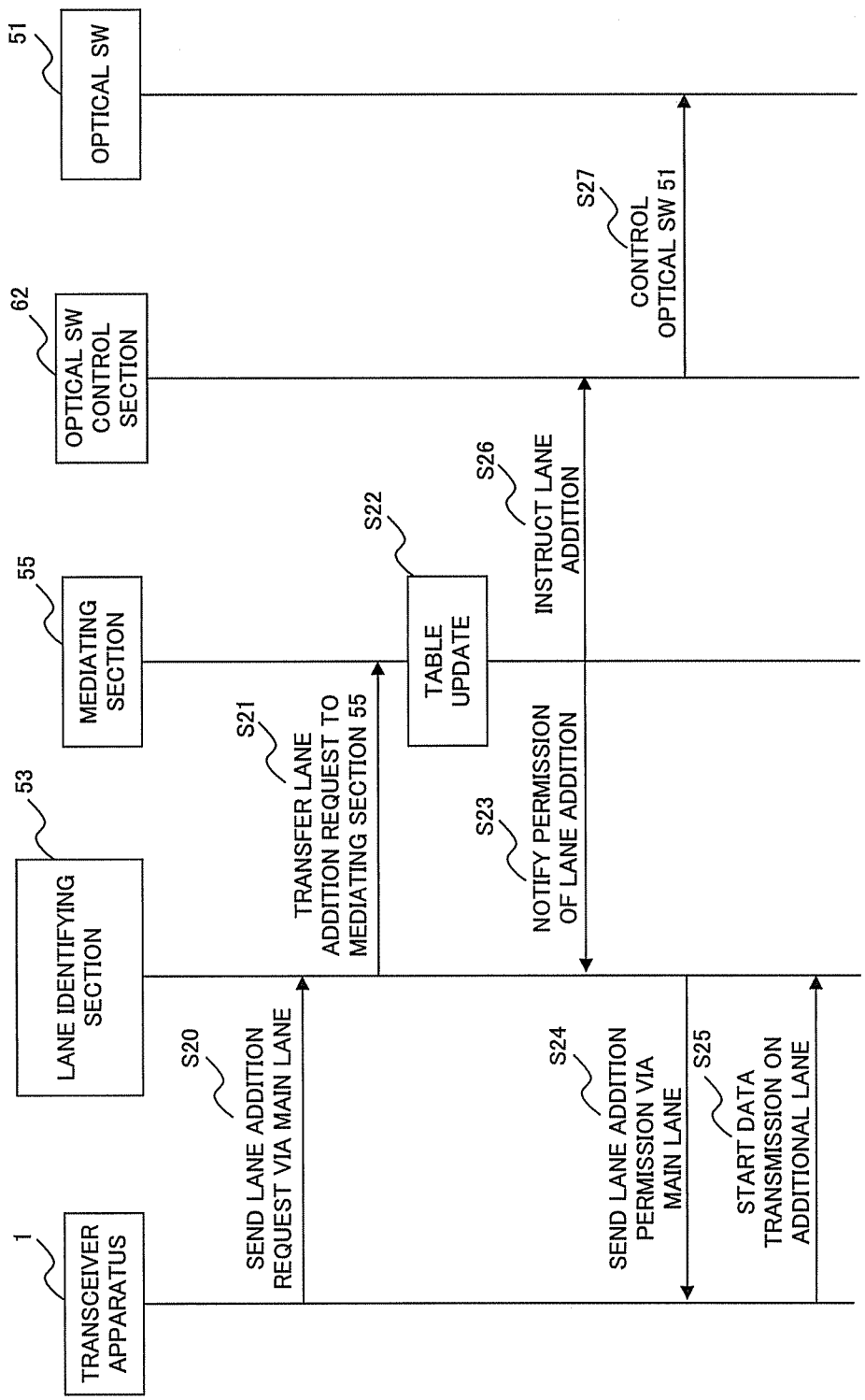
FIG. 23 is a diagram illustrating one example of the configuration of a memory depicted in FIG. 17.

Herein, one example of lane addition processing is illustrated in FIG. 23.

As illustrated in FIG. 23, a transceiver apparatus 1 sends a lane addition request to the concentrator 48 through the main lane (Step S20). The lane addition request may be included in control information that is sent from the transceiver apparatus 1 through the main lane, for example.

Next, the lane identifying section 53 in the concentrator 48 extracts the lane addition request from the data received via the optical SW 51 and the optical receiving section 52, and sends out the extracted lane addition request to the mediating section 55 (Step S21).

In response to receiving the lane addition request from the lane identifying section 53, the mediating section 55 determines whether or not addition of the lane based on the lane addition request is possible, based on the contents in the table 63.

When it is determined by the mediating section 55 that the lane addition is possible, the mediating section 55 updates the contents in the table 63 (Step S22), and instructs addition of the lane (Step S26) to the optical SW control section 62.

In contrast, when it is determined by the mediating section 55 that addition of the lane is not possible, the mediating section 55 notifies the transceiver apparatuses 1 that addition of a lane is not permitted.

The optical SW control section 62 controls a connection between an input port and an output port in the optical SW 51 based on the instruction for the lane addition from the mediating section 55 (Step S27). For example, the optical SW control section 62 controls a connection between an input port and an output port in the optical SW 51 such that a variable lane, the addition of which is permitted by the mediating section 55, and which is to be used by a transceiver apparatus 1, is connected to one of the second output ports in the optical SW 51.

In addition, when it is determined by the mediating section 55 that addition of the lane is possible, the mediating section 55 provides the lane identifying section 53 with information on permission of the lane addition (Step S23).

The lane identifying section 53 provides information on permission of the lane addition to the transceiver apparatus 1 through the main lane (Step S24).

In response to the information on permission of the lane addition being provided by the concentrator 48, the transceiver apparatus 1 starts transmission of data using the variable lane, the addition of which is permitted by the mediating section 55 (Step S25).

Figure 24:
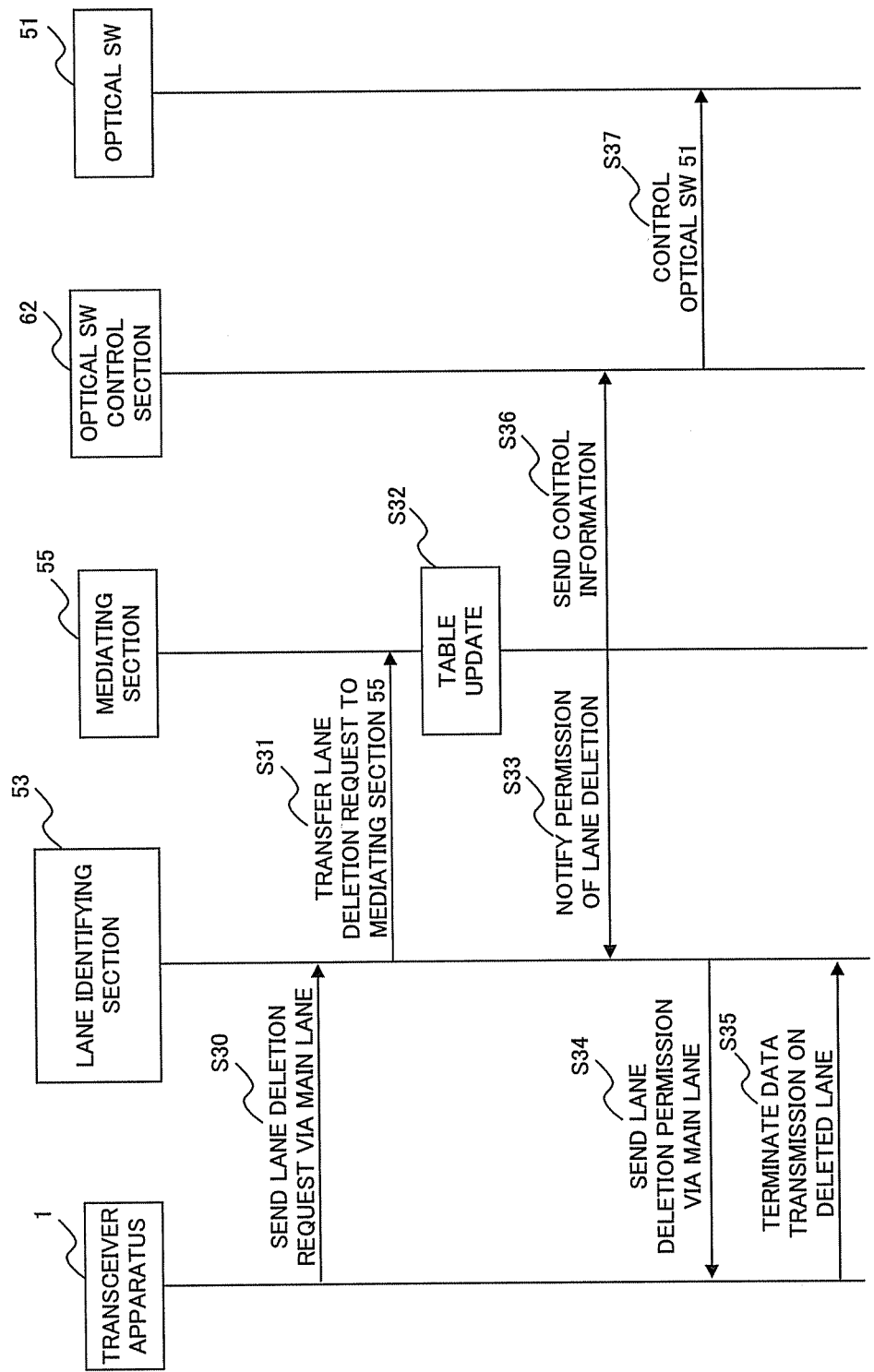
FIG. 24 is a diagram illustrating one example of the operation of the transceiver system depicted in FIG. 17.

Herein, one example of lane deletion processing is illustrated in FIG. 24.

As illustrated in FIG. 24, a transceiver apparatus 1 sends a lane deletion request to the concentrator 48 through the main lane (Step S30). The lane deletion request may be included in control information that is sent from the transceiver apparatus 1 through the main lane, for example.

Next, the lane identifying section 53 in the concentrator 48 extracts the lane deletion request from the data received via the optical SW 51 and the optical receiving section 52, and sends out the extracted lane deletion request to the mediating section 55 (Step S31).

In response to receiving the lane deletion request from the lane identifying section 53, the mediating section 55 determines whether or not deletion of the lane based on the lane deletion request is possible, based on the contents in the table 63. When deletion of the main lane is requested, the mediating section 55 does not permit the deletion of that lane. In contrast, when deletion of a variable lane is requested, the mediating section 55 may permit deletion of that lane.

When it is determined by the mediating section 55 that the lane deletion is possible, the mediating section 55 updates the contents in the table 63 (Step S32), and instructs deletion of the lane to the optical SW control section 62 (Step S36).

In contrast, when it is determined by the mediating section 55 that addition of the lane is not possible, the mediating section 55 notifies the transceiver apparatuses 1 that deletion of a lane is not permitted.

The optical SW control section 62 controls a connection between an input port and an output port in the optical SW 51 based on the instruction for the lane deletion from the mediating section 55 (Step S37). For example, the optical SW control section 62 controls a connection between an input port and an output port in the optical SW 51 such that a variable lane, which is deleted and the transceiver apparatus 1 thus cannot use it any more, is connected to none of the output ports in the optical SW 51.

In addition, when it is determined by the mediating section 55 that the lane deletion is possible, the mediating section 55 provides the lane identifying section 53 with information on permission of the lane deletion (Step S33).

The lane identifying section 53 provides information on permission of the lane deletion to the transceiver apparatus 1 through the main lane (Step S34).

In response to the information on permission of the lane deletion being provided by the concentrator 48, the transceiver apparatus 1 stops (terminates) transmission of data using the variable lane, the deletion of which is permitted by the mediating section 55 (Step S35).

As described above, in this example, since connections in the optical SW 51 are dynamically switched in accordance with a lane addition request or a lane deletion request from a transceiver apparatus 1, the concentrator 48 can be constructed with smaller numbers of optical modules 52 and 53 than the total number of parallel transmission channels provided to the transceiver apparatuses 1.

As a result, power consumption in the transceiver system 90 can be significantly reduced.

Referring back to FIG. 17, the memory (output section) 54 will be described.

The memory 54 reorders data from the transceiver apparatus 1 in the order based on the above link number and lane number that are extracted by the lane identifying section 53, and outputs the reordered data.

Figure 25:
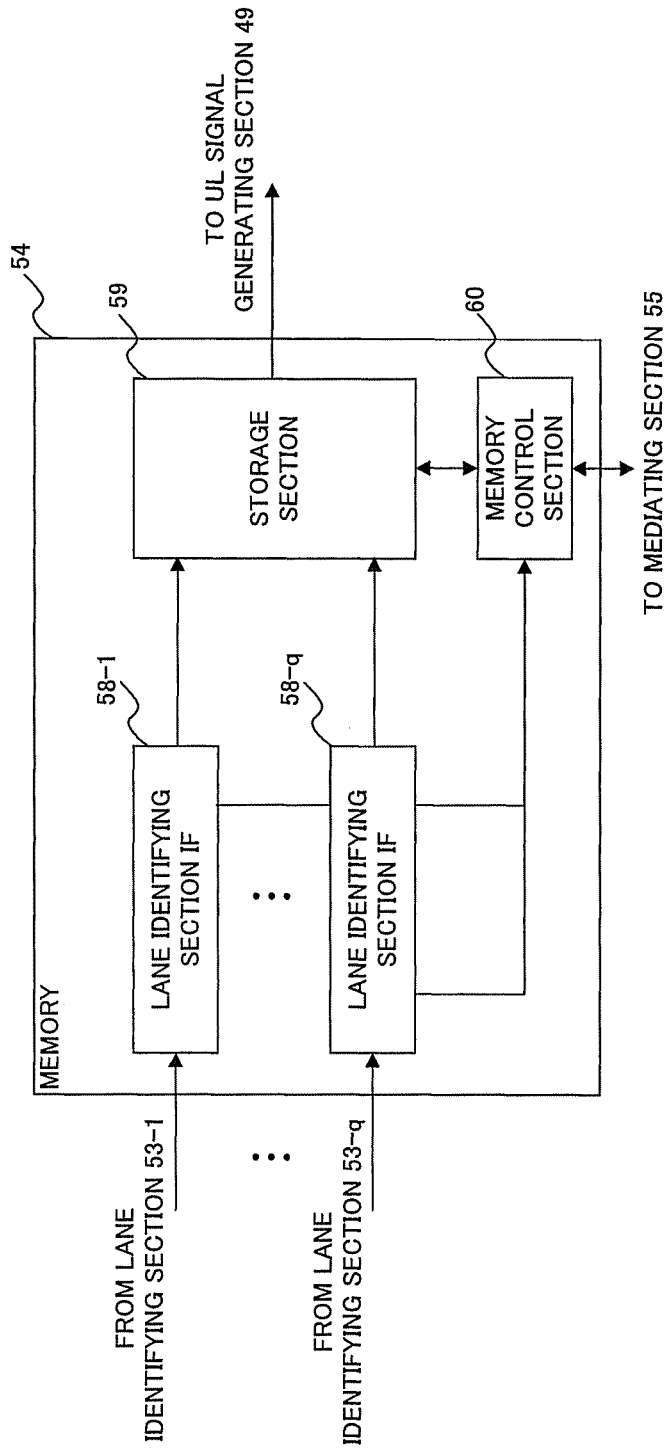
FIG. 25 is a diagram illustrating one example of the operation of the transceiver system depicted in FIG. 17.

For this purpose, the memory 54 includes, as illustrated in FIG. 25, a plurality of lane identifying section interfaces (lane identifying section IF) 58-1 to 58-q, a storage section 59, and a memory control section 60. Note that, hereinafter, if no distinction among the lane identifying section IFs 58-1 to 58-N is necessary, they are simply referred to as "lane identifying section IFs 58".

A lane identifying section IF 58 removes a link number and a lane number included in data sent from a transceiver apparatus 1, and sends out data, from which the link number and the lane number are removed, to the storage section 59.

In addition, the lane identifying section IF 58 provides the memory control section 60 with the link number and lane number extracted by the lane identifying section 53.

Furthermore, the lane identifying section IF 58 can execute skew correction/compensation on data sent from a transceiver apparatus 1.

The storage section 59 stores data from the lane identifying section IF 58, from which the link number and the lane number are removed, reorders that data under the control of the memory control section 60, and sends out the reordered data to the UL signal generating section 49.

The memory control section 60 controls to reorder data to be stored in the storage section 59, from which the link number and the lane number are removed, in a predetermined order based on the link number and the lane number from the lane identifying section IF 58. In this example, the term "predetermined order" refers to an order in which a plurality of pieces of data is arranged in ascending order of lane numbers for each link number, for example.

Herein, the reorder processing described above will be described with reference to FIG. 26.

Since any number of lanes may be used between the concentrator 48 and each of the transceiver apparatuses 1, the concentrator 48 controls the order of reading from the memory 54 based on the link number and the lane number received by the lane identifying section 53.

Thus, the concentrator 48 reorders data in the order corresponding to lane numbers of the respective transceiver apparatuses 1, and sends out the data to the UL side.

For this purpose, as depicted in FIG. 26, for example, the lane identifying section 53 firstly extracts and identifies a link number and a lane number included in data sent from the transceiver apparatus 1 (FIG. 26 (1)).

In the example depicted in FIG. 26, it is indicated that the data received by the lane identifying section 53-1 is the data sent through main lane (Lane Number #1) used by the transceiver apparatus 1-1 (Link Number #1), and that the data received by the lane identifying section 53-21 is the data sent through a variable lane (Lane Number #2) used by the transceiver apparatus 1-1 (Link Number #1). In addition, it is indicated that the data received by the lane identifying section 53-27 is the data sent through a variable lane (Lane Number #4) used by the transceiver apparatus 1-1 (Link Number #1), and that the data received by the lane identifying section 53-35 is the data sent through a variable lane (Lane Number #3) used by the transceiver apparatus 1-1 (Link Number #1).

Furthermore, it is indicated that the arrival of order data is as follows: the data sent through Lane Number #3, the data sent through Lane Number #4, the data sent through Lane Number #2, and the data sent through Lane Number #1, for example.

Next, the lane identifying section IF 58 executes skew correction/compensation processing on each of the above pieces of data, removes link numbers and lane numbers from the data, and writes the data, from which link numbers and lane numbers are removed, into the storage section 59 (FIG. 26 (2)).

The memory control section 60 then reorders and outputs data in the order based on the link numbers and the lane numbers by reading the each pieces of data stored in the storage section 59 in the order of lane number (FIG. 26 (3)).

Thereby, the concentrator 48, in this example, can reorder and output data from the transceiver apparatuses 1 in the order of link numbers and lane numbers even when the correlations between parallel transmission channels used by the transceiver apparatuses 1 and respective optical modules 52 and 53 are arbitrary.

Referring back to FIG. 17, the UL signal generating section 49 and the optical transmitting section 50 will be described.

The UL signal generating section 49 generates a UL signal based on the data from the memory 54. For example, the UL signal generating section 49 concentrates data from the transceiver apparatus 1, and executes format conversion processing in accordance with the transmission format used at the transmission path on the UL side or the transceiver system on the UL side. The UL signal generated by the UL signal generating section 49 is sent out to the optical transmitting section 50.

In addition, the optical transmitting section 50 executes predetermined optical transmission processing on the UL signal from the UL signal generating section 49, and sends the data to the transmission path on the UL side or the transceiver system on the UL side.

As described above, since transceiver system 90 can concentrate the transceiver apparatuses 1 using the optical modules 52 and 53, the number of which is smaller than totaling N×n parallel transmission channels provided to the transceiver apparatuses 1, it is possible to significantly reduce the power consumption of the system.

In addition, the transceiver system 90 in this example can be applicable without making a drastic modification to the system even when the transceiver apparatuses 1 send signals at a faster speed. For example, a transceiver apparatus having a link speed of 1 Tbps class, which may transmit data on 25 Gbps×40 lanes, can be supported by adding input ports in the optical SW 51.

(4) Variants

The transceiver system 90 set forth previously has been described with reference to the example in which the concentrator 48 concentrates a plurality of transceiver apparatuses 1 towards the UL side, and another example may be in that a concentrator may distribute a DL signal that is received from the down link (DL) direction, which is opposite to the UL direction, to a plurality of transceiver apparatuses 1.

Figure 27:
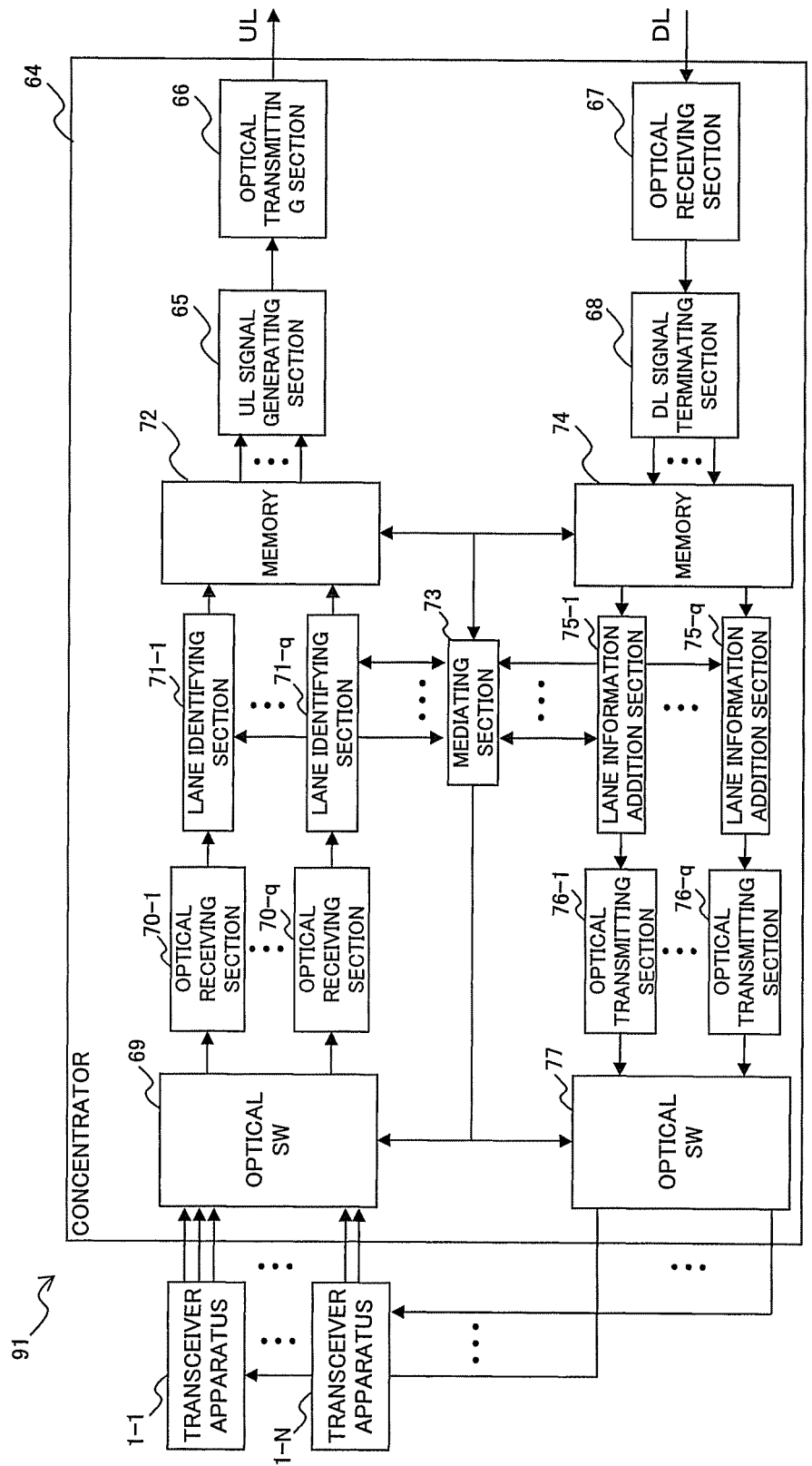
FIG. 27 is a diagram illustrating one example of the configuration of a transceiver system.

Referring to FIG. 27, one example of the configuration of a transceiver system 91 is depicted.

The transceiver system 91 depicted in FIG. 27 may include a plurality of transceiver apparatuses 1-1 to 1-N and a concentrator 64, for example. Note that the structure and the functions of the transceiver apparatuses 1 have been described previously.

The concentrator 64 concentrates N transceiver apparatuses 1 towards the transmission path on the UL side or the transceiver system on the UL side, as well as distributing a DL signal sent from the UL side to the plurality of transceiver apparatuses 1.

In this example, the concentrator 64 may include an optical SW 69, optical receiving sections 70-1 to 70-$q$, lane identifying sections 71-1 to 71-$q$, a memory 72, a mediating section 73, a UL signal generating section 65, and an optical transmitting section 66. In addition, the concentrator 64 may include an optical receiving section 67, a DL signal terminating section 68, a memory 74, a lane information addition sections 75-1 to 75-$q$, optical transmitting sections 76-1 to 76-$q$, and an optical SW 77, for example. Note that, hereinafter, if no distinction among optical receiving sections 52-1 to 52-$q$ is necessary, they may be simply referred to as "optical receiving sections 52". If no distinction among the lane identifying sections 53-1 to 53-$q$ is necessary, they may be simply referred to as "lane identifying sections 53". Note that, hereinafter, if no distinction among the lane information addition sections 75-1 to 75-$q$ is necessary, they may be simply referred to as "lane information addition sections 75". If no distinction among the optical transmitting sections 76-1 to 76-$q$ is necessary, they may be simply referred to as "optical transmitting sections 76".

Note that the optical SW 69, the optical receiving sections 70, the lane identifying sections 71, the memory 72, the UL signal generating section, and the optical transmitting section 66 have the same functions as those of the optical SW 51, the optical receiving sections 52, the lane identifying sections 53, the memory 54, the UL signal generating section 49, and the optical transmitting section 50 that have been described previously.

In addition, the mediating section 73 at least has the functions of the above-described mediating section 55.

In this example, the optical receiving section 67 executes predetermined optical reception processing on a DL signal sent from the transmission path on the UL side or the transceiver system on the UL side, and sends out the received optical signal to the DL signal terminating section 68.

The DL signal terminating section 68 terminates the DL signal from the optical receiving section 67. The DL signal includes, for example, data addressed to transceiver apparatuses 1. The DL signal terminating section 68, for example, decomposes the DL signal to pieces of data addressed to the respective transceiver apparatuses 1, and sends them out to the memory 74.

The memory 74 distributes the pieces of date from the DL signal terminating section 68 to the respective parallel transmission channels used by the transceiver apparatuses 1.

Figure 28:
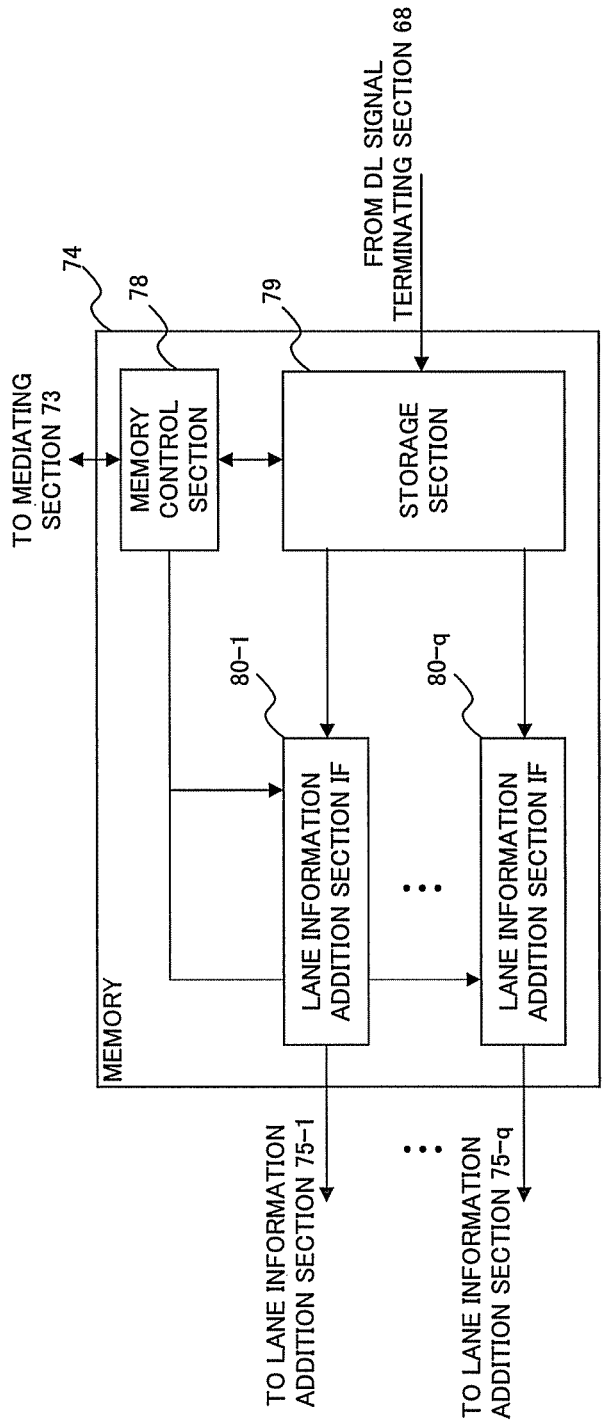
FIG. 28 is a diagram illustrating one example of the configuration of a memory depicted in FIG. 27.

For this purpose, the memory 74 includes, as illustrated in FIG. 28, a memory control section 78, a storage section 79, and lane information addition section IFs 80-1 to 80-$q$. Note that, hereinafter, if there is no distinction among the lane information addition section IFs 80-1 to 80-N is necessary, they are simply referred to as "lane information addition section IFs 80".

In this example, the storage section 79 stores the DL signal from the DL signal terminating section 68.

The memory control section 78 then controls the storage section 79 to read the DL signal stored in the storage section 79 so as to read pieces of data for each transceiver apparatus 1 and for each lane. The correlation indicating which piece of data corresponds to which transceiver apparatus 1 and which parallel transmission channel may be identified using a control signal included in the DL signal, or may be determined based on transmission processing for the UL side at the mediating section 73.

A lane information addition section IF 80 sends out the data read from the storage section 79 by the memory control section 78 to the lane information addition section 75. The lane information addition section IF 80 may provide lane information addition section 75 with a link number and a lane number corresponding to each piece of data, for example. Note that the lane information addition section 75 is provided with which link number and which lane number are added to which data from the mediating section 73 via the memory control section 78, for example.

In this example, the lane information addition section 75 depicted in FIG. 27 adds a link number and a lane number to the date from the memory 74.

Figure 29:
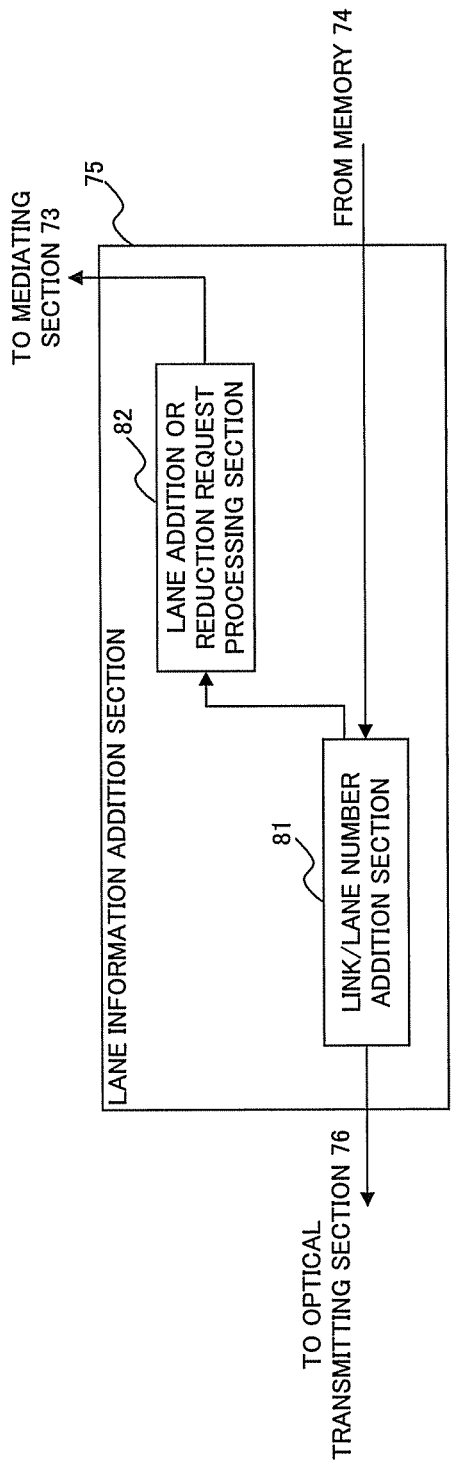
FIG. 29 is a diagram illustrating one example of the configuration of a lane information addition section depicted in FIG. 27.

For this purpose, a lane information addition section 75 includes a link/lane number addition section 81 and a lane addition or deletion request processing section 82, as illustrated in FIG. 29.

The link/lane number addition section 81 adds a link number and a lane number corresponding to the data to data from a lane information addition section IF 80. Note that the link number and the lane number may be provided by the lane information addition section IF 80, or may be provided by the mediating section 73, for example.

Herein, the above-described addition processing of a link number and a lane number will be described with reference to FIG. 30.

Figure 30:
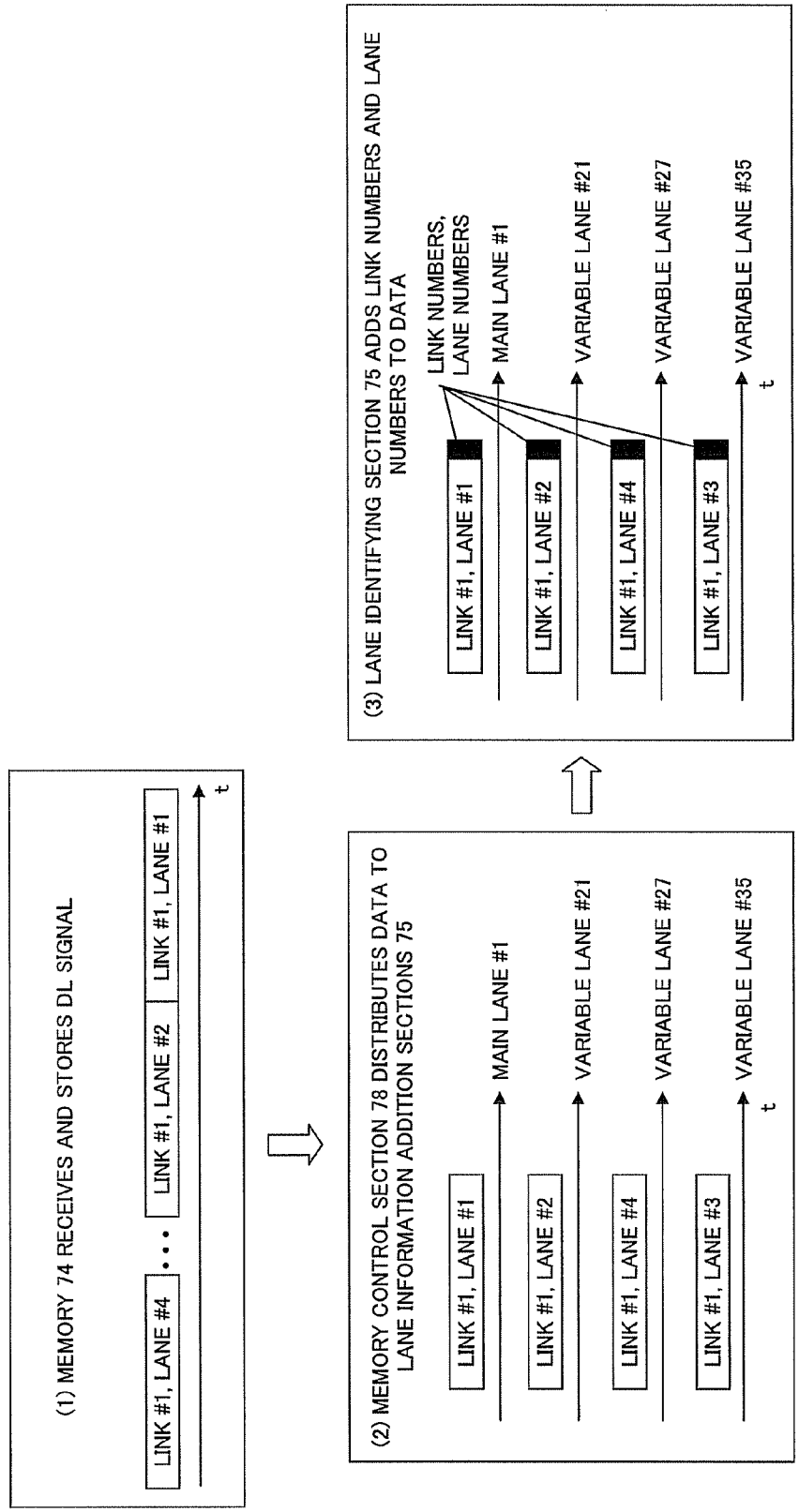
FIG. 30 is a diagram illustrating one example of the operation of the transceiver system depicted in FIG. 27.

For example, as depicted in FIG. 30, the memory 74 receives a DL signal from the DL signal terminating section 68, and stores it (FIG. 30 (1)).

In the example depicted in FIG. 30, the DL signal at least includes pieces of data addressed to the respective parallel transmission channels (Lane Numbers #1 to #4) of the transceiver apparatus 1-1 (Link Number #1), for example.

In this case, the arrival of order data is as follows: the data sent through Lane Number #1, the data sent through Lane Number #2, the data sent through Lane Number #3, and the data sent through Lane Number #4.

Next, the memory control section 78 distributes each piece of data to the respective lane information addition sections 75 (FIG. 30 (2)).

Thereby, in the example depicted in FIG. 30, the data addressed to the main lane (Lane Number #1) of the transceiver apparatus 1-1 is sent out to the lane information addition section 75-1, and the data addressed to a variable lane (Lane Number #21) of the transceiver apparatus 1-1 is sent out to the lane information addition section 75-21. In addition, the data addressed to a variable lane (Lane Number #27) of the transceiver apparatus 1-1 is sent out to the lane information addition section 75-27, and the data addressed to a variable lane (Lane Number #35) of the transceiver apparatus 1-1 is sent out to the lane information addition sections 75-35.

Each lane information addition section 75 then adds a link number and a lane number to each piece of data, and sends it out to the optical transmitting section 76 (FIG. 30 (3)).

In addition, a link/lane number addition section 81 depicted in FIG. 29 extracts a lane addition request or a lane deletion request from the UL side, which is included in data from the lane information addition section IF 80, and provides it to the lane addition or deletion request processing section 82.

Furthermore, the lane addition or deletion request processing section 82 provides the lane addition request or lane deletion request from the UL side extracted by the link/lane number addition section 81 to the mediating section 73. Note that it is sufficient that lane addition or deletion request processing sections 82 be provided at least lane information addition sections 75 (for example, the lane information addition sections 75-1 to 75-20) that are connected to the main lanes, since an addition or deletion request of a parallel transmission channel is sent via a main lane.

In addition, the mediating section 73 depicted in FIG. 27 at least includes the functions of the mediating section 55, and also controls a connection between an input port and an output port in the optical SW 77 based on a link number and a lane number that are added to the data by a lane information addition section 75.

The data from the lane information addition section 75 is sent out by optical transmitting section 76 to the optical SW 77, and is relayed to the transceiver apparatus 1.

The optical SW 77 in this example includes N×n input ports, each of which is connected to the N transceiver apparatuses 1 via one of n parallel transmission channels, and a plurality of output ports selectively connected to the N×n input ports, the number of which is smaller than the number of the N×n input ports.

The mediating section 73 then controls a connection between an input port and an output port in the optical SW 77 such that the optical transmitting section 76 is connected to a parallel transmission channel that is the destination of the data included in the DL signal.

As described previously, the concentrator 64 in this example can further reduce the power consumption in transceiver system 91 since the numbers of lane information addition sections 75 and optical transmitting section 76 can be reduced, as well as being capable of reducing the numbers of optical receiving sections 70 and lane identifying sections 71.

(5) Others

It is noted that the configurations and operations of the transceiver apparatus 1 and concentrator 41, 48, or 64 which have been described may be omitted or may be combined as appropriate if necessary.

For example, the present invention may be applied to any transceiver systems that employ parallel transmission channels, and is not limited to the optical transceiver system 30, 40, 90, or 91 described above.

In addition, it is sufficient that a transceiver apparatus 1 used for the transceiver system 40, 90, and 91 at least include functions to determine at least one parallel transmission channel that is to be used, from a plurality of parallel transmission channels, in accordance with the amount of data, and to send data using that parallel transmission channel, for example.

Furthermore, the concentrator 41 used for the transceiver system 40 and the concentrator 48 used for the transceiver system 90, which have been described previously, may stop power supplies to optical modules 42, 43, 44, 52, and 53 to which data from a transceiver apparatus 1 is not inputted, for example. In addition, the concentrator 64 used for the above-described transceiver system 91 may stop power supplies to optical modules 70, 71, 75, and 76 to which data from a transceiver apparatus 1 is not inputted, for example. This may help to further reduce the power consumption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. A transceiver apparatus that divides input data and sends the divided data using a plurality of parallel transmission channels, the transceiver apparatus comprising:
    a plurality of transmitting sections that are capable of sending the divided data using the plurality of parallel transmission channels;
    a channel determination section that determines at least one parallel transmission channel to be used from the plurality of parallel transmission channels in accordance with an amount of the input data; and
    a power source control section that supplies a power source to a transmitting section which sends the divided data using the parallel transmission channel determined by the channel determination section from the plurality of transmitting sections while not supplying a power source to a transmitting section which does not sends the divided data from the plurality of transmitting sections,
    wherein a number of determined parallel transmission channels is adjusted in accordance with the amount of the input data.

2. The transceiver apparatus according to claim 1, wherein the data is inputted to the transceiver apparatus through one input channel, and the divided data is outputted through the plurality of parallel transmission channels corresponding to the input channel.

3. The transceiver apparatus according to claim 1, further comprising a distribution section that distributes the divided data among the transmitting sections to which the power source is supplied by the power source control section.

4. The transceiver apparatus according to claim 1, wherein the transmitting section sends control information related to the parallel transmission channel determined by the channel determination section.

5. The transceiver apparatus according to claim 4, wherein the control information is included in a header part in a transmission frame that conveys the divided data.

6. The transceiver apparatus according to claim 4, wherein the control information includes information about addition or reduction of a parallel transmission channel to be used from the plurality of parallel transmission channels.

7. The transceiver apparatus according to claim 4, wherein the control information includes information about which parallel transmission channel is used and which parallel transmission channel is not used from the plurality of parallel transmission channels.

8. The transceiver apparatus according to claim 1, wherein the power source is supplied prior to the determination by the channel determination section.

9. The transceiver apparatus according to claim 1, further comprising:
- a plurality of memory sections that store the divided data;
- a memory control section that determines at least one memory section to be used from the plurality of memory sections in accordance with the amount of the data; and
- a memory power source control section that supplies a power source to the memory section from the plurality of memory sections which is determined by the memory control section while not supplying a power source to a memory section from the plurality of memory sections which is not determined by the memory control section.

10. A concentrator, comprising:
an optical switch comprising:
- a plurality of input ports, each of the plurality of input ports being connected to one of the plurality of transceiver apparatuses according to claim 1 via a plurality of parallel transmission channels; and
- a plurality of output ports selectively connected to the plurality of input ports, the number of plurality of output ports being smaller than the number of the plurality of input ports;
a plurality of optical modules, each of the plurality of optical modules being connected to one of the output ports and processes data sent from the plurality of transceiver apparatuses; and
a control section that controls connection of an input port and an output port in the optical switch based on control information on usage of the parallel transmission channels by each of the transceiver apparatuses, the information being extracted from data by the process,
wherein the control section controls connection of an input port and an output port in the optical switch such that a parallel transmission channel used by the transceiver apparatus is connected to the optical module.

11. The concentrator according to claim 10, wherein
each of the transceiver apparatuses respectively uses at least one parallel transmission channel, and
the control information is included in data sent from that parallel transmission channel.

12. The concentrator according to claim 10, wherein
the optical module comprises an output section that extracts identification information of the transceiver apparatus and identification information of a parallel transmission channel contained in each of a plurality of pieces of data sent via the parallel transmission channel by the transceiver apparatus, and
reorders and outputs the plurality of pieces of data in an order that is based on the identification information of the transceiver apparatus and the identification information of the parallel transmission channel that are extracted.

* * * * *